United States Patent [19]

Guthery et al.

[11] Patent Number: 5,204,965

[45] Date of Patent: Apr. 20, 1993

[54] DATA PROCESSING SYSTEM USING STREAM STORES

[75] Inventors: Scott B. Guthery, Austin, Tex.; Paul S. Barth, Georgetown; David R. Barstow, Wilton, both of Conn.

[73] Assignee: Schlumberger Technology Corporation, New York, N.Y.

[21] Appl. No.: 409,969

[22] Filed: Sep. 19, 1989

Related U.S. Application Data

[63] Continuation of Ser. No. 135,546, Dec. 18, 1987, which is a continuation of Ser. No. 767,409, Aug. 20, 1985, abandoned.

[51] Int. Cl.$^5$ .............................................. G06F 15/82
[52] U.S. Cl. ............................ 395/800; 364/DIG. 2; 364/972; 364/930.1; 364/931.4; 364/938.5
[58] Field of Search ... 364/200 MS File, 900 MS File; 395/800

[56] References Cited

U.S. PATENT DOCUMENTS

| | | | |
|---|---|---|---|
| 3,166,709 | 1/1965 | Doll | 324/6 |
| 4,128,882 | 12/1978 | Dennis | 395/800 |
| 4,149,240 | 4/1979 | Misunas et al. | 364/200 |
| 4,153,932 | 5/1979 | Dennis et al. | 364/200 |
| 4,197,589 | 4/1980 | Cornish et al. | 364/900 |
| 4,229,790 | 10/1980 | Gilliland et al. | 364/200 |
| 4,257,097 | 3/1981 | Moran | 364/200 |
| 4,350,979 | 9/1982 | Eberwein | 370/78 |
| 4,412,286 | 10/1983 | O'Dowd et al. | 364/200 |
| 4,494,188 | 1/1985 | Nakane et al. | 364/200 |
| 4,591,979 | 5/1986 | Iwashita | 364/200 |
| 4,757,466 | 7/1988 | Miygaoka et al. | 364/200 |
| 4,780,820 | 10/1988 | Sowa | 364/200 |
| 4,939,648 | 7/1990 | O'Neill et al. | 364/200 |
| 4,972,314 | 11/1990 | Getzinger et al. | 364/200 |

FOREIGN PATENT DOCUMENTS 0101158 2/1984 European Pat. Off. .

OTHER PUBLICATIONS

Davis, A. L., "Computer Architecture", IEEE Spectrum, Nov. 1983, pp. 94-99.

Lerner, E. J., "Data-flow Architecture", IEEE Spectrum, Apr. 1984, pp. 57-62.

Morenoff, E. et al, "Inter-Program Communications, program string structures and buffer files", AFIPS Conference Proc. 30, Apr. 1967, pp. 175-183.

Watson, I. et al., "A Practical Data Flow Computer", IEEE Computer, Feb. 1982, pp. 51-57.

(List continued on next page.)

*Primary Examiner*—Joseph L. Dixon
*Assistant Examiner*—Rebecca L. Rudolph
*Attorney, Agent, or Firm*—Charles D. Huston; Marc D. Foodman

[57] ABSTRACT

A system and method for data processing in which data processing tasks are arranged as separate processes, each of which can be executed by a dedicated central processing unit or by one or more shared processing units. All communication between processes takes place via streams of data items. Each stream receives data items from a single source, for example from an input to the processing system or from one of the processes. Every data item appended to a stream is associated with a unique index value—even if physical memory locations are re-used, index values never are. A process can request a data item in terms of the stream where it is stored and the index value associated with it. Within constraints imposed by physical storage capacity, any index value can be included in a request. If the data item is not yet available, execution of the process is suspended until the data item becomes available. A data item can be requested with a limit on the time that elapses before the attempt is aborted; also a request can be made for the data item most recently appended to a stream instead of in terms of a specific index value. This architecture facilitates data processing involving both time-independent and time-dependent processes.

27 Claims, 11 Drawing Sheets

OTHER PUBLICATIONS

Adams, D. A., "A Computational Model with Data Flow Sequencing", Technical Report CS 117, Computer Science Department, Stanford University, (Dec. 1968), pp. 1–48.

Balzer, R. M., "PORTS—a method for dynamic interprogram communication and job control", AFIPS Conference Proceedings 38, *Spring-Joint Computer*, (May, 1971) pp. 485–489.

Burge, W. H., "Stream Processing Functions", *IBM Journal of Research and Development*, (Jan. 1975), vol. 19, pp. 12–25.

Davis, A. L., and R. M. Keller,"Data Flow Program Graphs", *Computer*, (Feb. 1982), pp. 26–41.

Dennis, J. B. and K. K.—S. Weng, "An Abstract Implementation for Concurrent Computation with Streams", *Proceedings of the International Conference on Parallel Processing*, (1979), pp. 35–45.

Hoare, C.A.R. "Communicating Sequential Processes", *Communications of the ACM*, (Aug. 1978), vol. 21, No. 8, pp. 666–677.

Kahn, et al., "Coroutines and Networks of Parallel Processes", *Information Processing 77, International Federation of Information Processing Societies* (1977), pp. 993–998.

Mao, T. W., and R. T. Yeh, "Communication Port: A Language Concept for Concurrent Programming", *IEEE Transactions on Software Engineering (Mar. 1980), vol. SE-6, No. 2, pp. 194–204*.

Morenoff, E. and J. B. MacLean, "Inter-program communications, program string structure and buffer files", AFIPS Conference Proceedings 30, *Spring-Joint Computer Conference*, (Apr. 1967), pp. 175–183.

Morrison, J. P., "Data Stream Linkage Mechanism", *IBM Systems Journal*, (1978), vol. 17, No. 4, pp. 383–408.

Nakata, Ikuo and Masataka Sassa, "Programming with Streams", IBM Research Report RJ 3751 (43317), (Jan. 18, 1983), pp. 1–59.

Paseman, W. G., "Applying Data Flow in the Real World", *BYTE*, McGraw-Hill, (May 1985), vol. 10, No. 5, pp. 201–214.

Ramamritham, K. and J. A. Stankovic, "Dynamic Task Scheduling in Hard Real-Time Distributed Systems", *IEEE Software*, (Jul. 1984), pp. 65–75.

Stevens, W. P., "How data flow can improve application development productivity", *IBM Systems Journal*, (1982), vol. 21, No. 2, pp. 162–178.

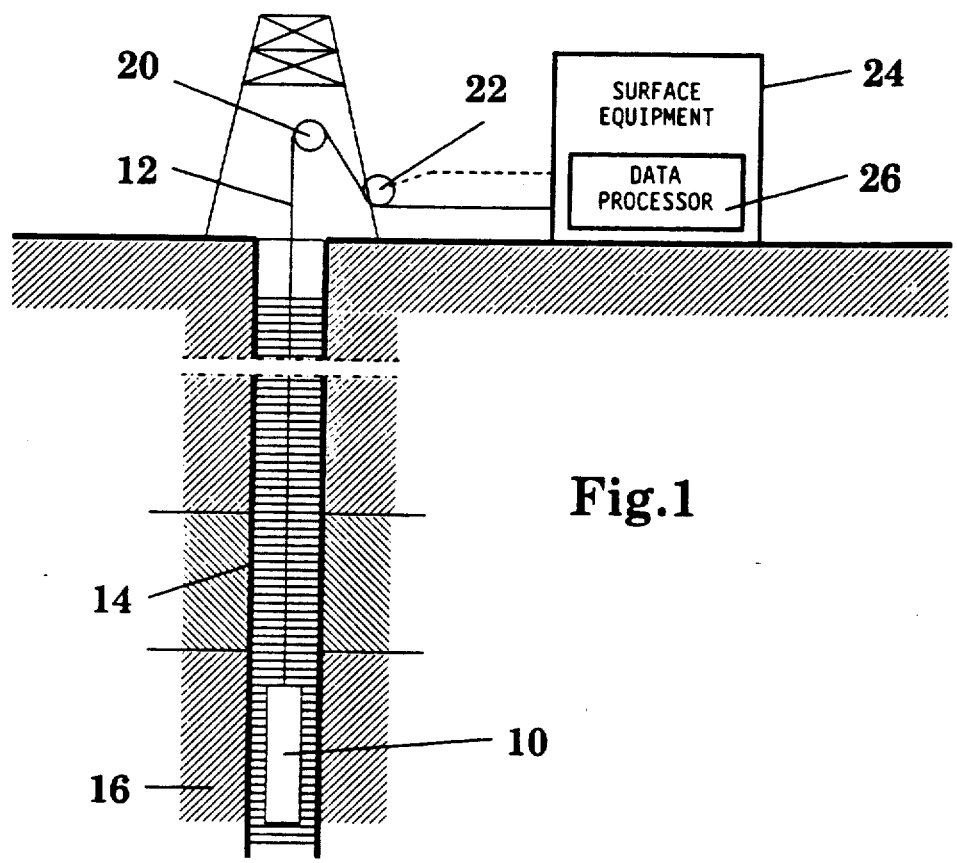
Fig.1
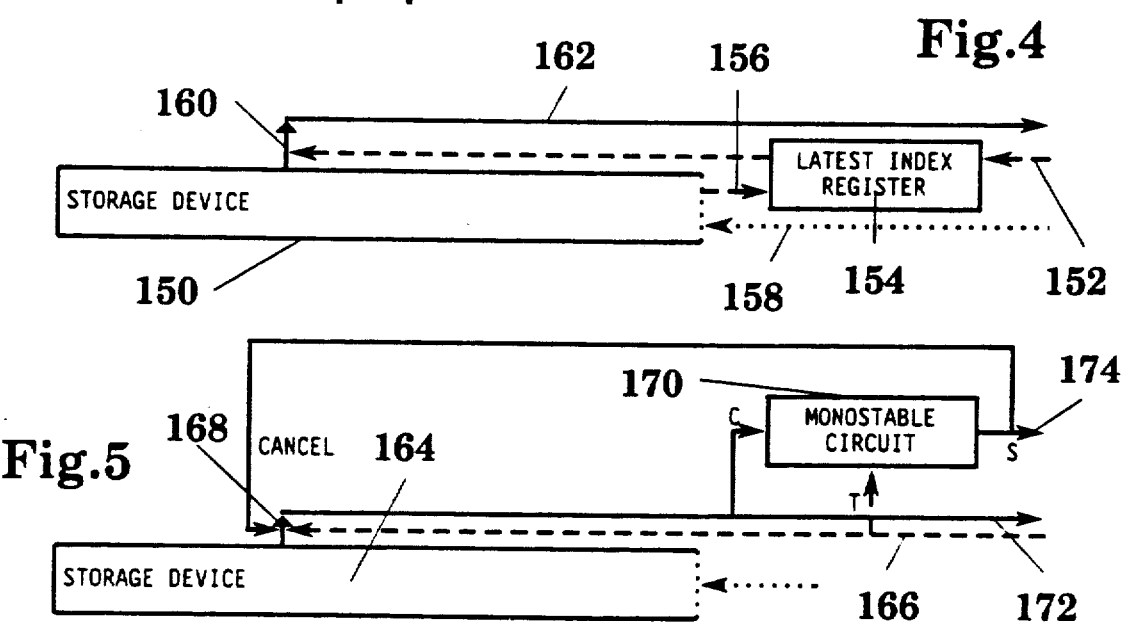
Fig.4
Fig.5

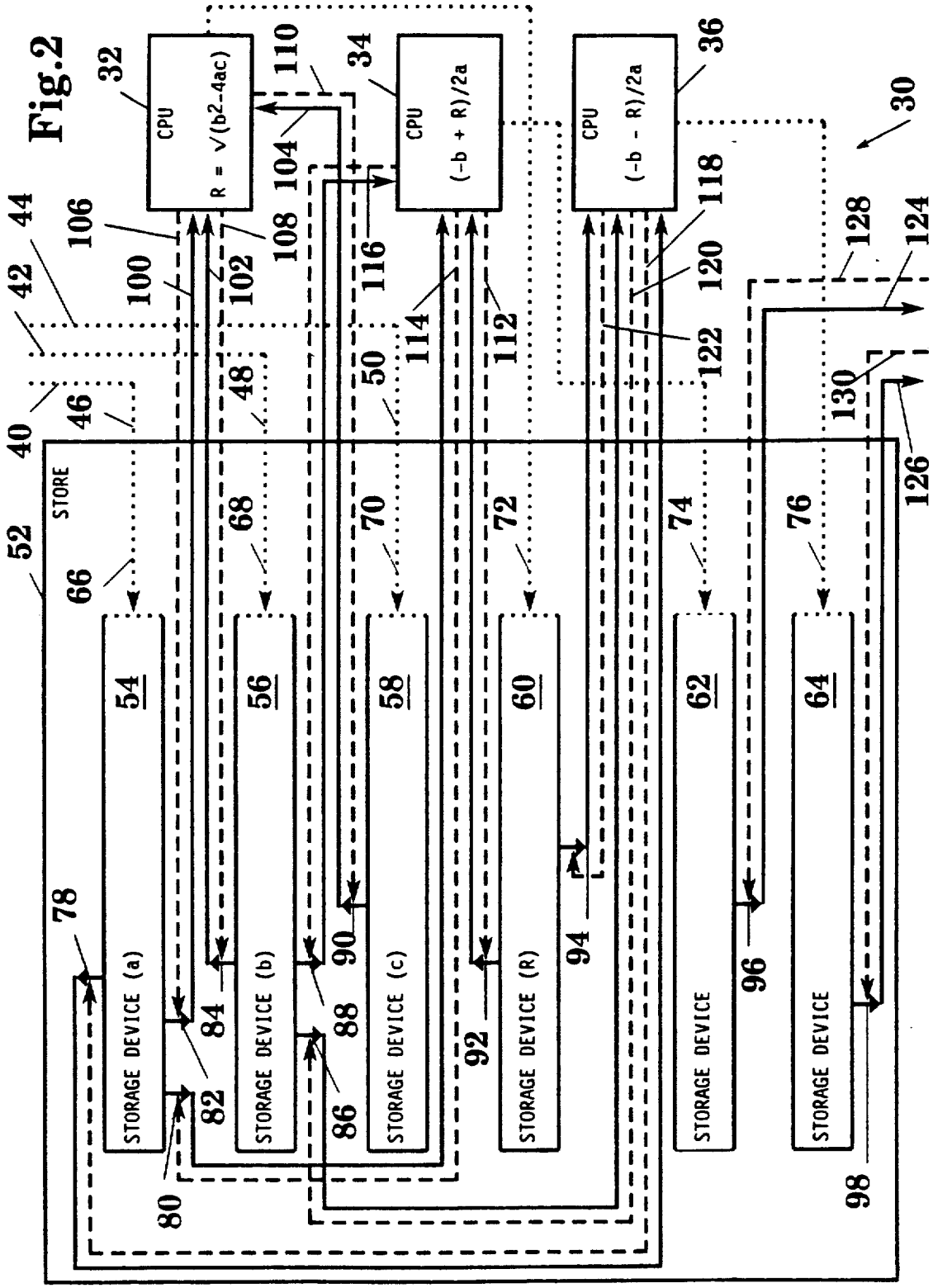

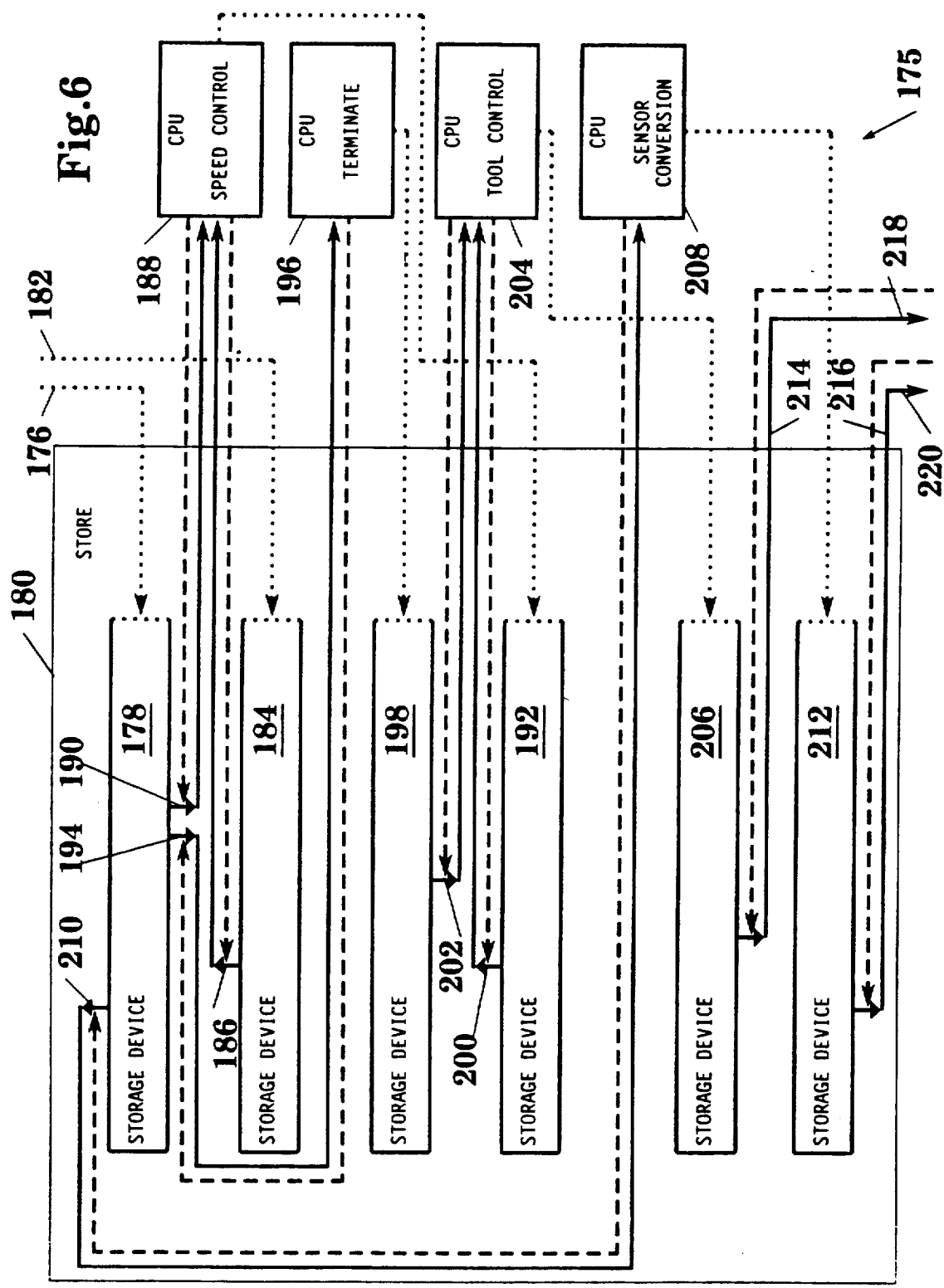

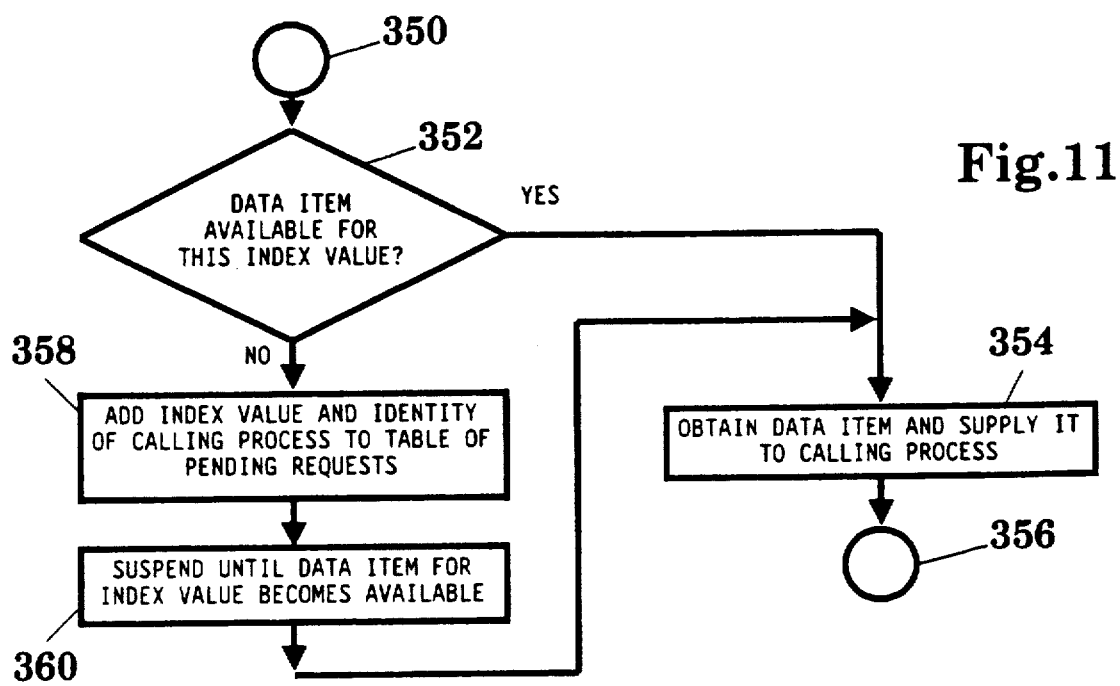
Fig.11
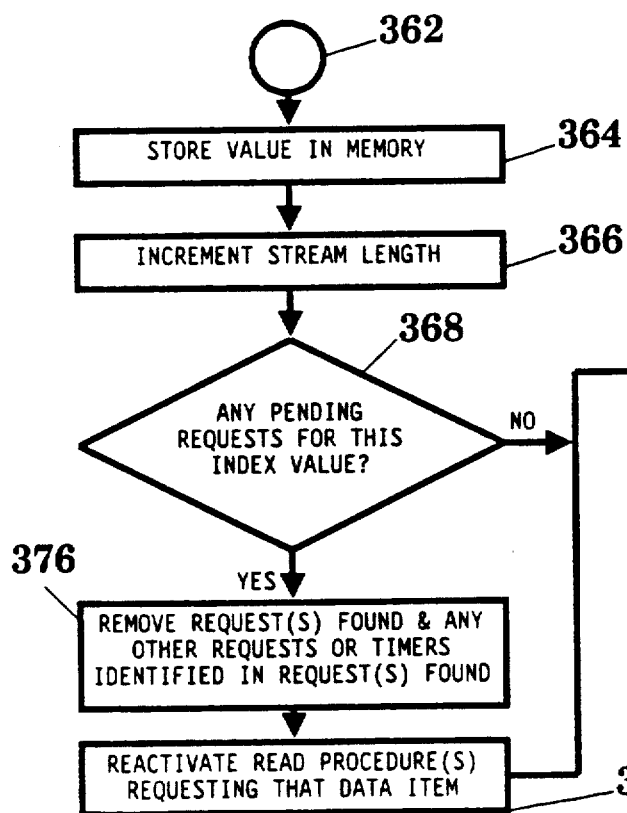
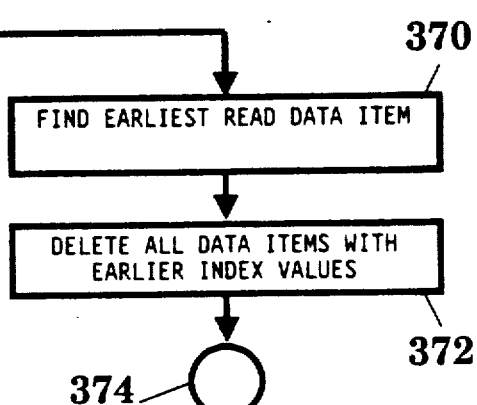
Fig.12

DATA PROCESSING SYSTEM USING STREAM STORES

This application is a continuation of application Ser. No. 135,546, filed Dec. 18, 1987, which is a continuation of application Ser. No. 767,409, filed Aug. 20, 1985, now abandoned.

BACKGROUND OF THE INVENTION

This invention relates to systems and methods for data processing, and particularly, though not exclusively, to systems and methods for processing data obtained during logging operations to investigate earth formations traversed by a borehole.

Borehole logging is an important step in the discovery and development of subsurface reserves of hydrocarbons and other valuable raw materials. Typically, after a borehole has been drilled an elongate logging tool or sonde is lowered to the bottom of the borehole on an armored cable containing electrical conductors for transmitting electrical power and signals between surface equipment and the sonde. The sonde is then raised up the borehole by winching the cable, and sensors in the sonde are used to measure electrical, acoustic and/or nuclear parameters of the formation traversed by the borehole. The measurements are transmitted up the cable to be recorded in the surface equipment. Analysis and interpretation of the measurements, either at the wellsite during logging or subsequently at a remote location, enables information about the presence and producibility of hydrocarbons or other materials to be obtained.

As reserves of hydrocarbons have been consumed it has become commercially economic to exploit reserves of increasing difficulty of extraction. Consequently the logging tools used to investigate such reserves have become increasingly complex and sophisticated, so that it is now common to provide a computer in the surface equipment at the wellsite to aid in monitoring and controlling the operation of the sonde and in collecting and analyzing the measurements made by the sonde. Such a computer typically performs a variety of functions: encoding and sending timing and other control signals to the sonde to trigger a measurement cycle; receiving signals from the sonde and decoding them to extract data relating to the measurements and the operation of the sonde; analyzing the data to monitor operation of the sonde and generate control signals to be sent to it to optimize its operation in accordance with borehole and formation conditions; monitoring the depth of the sonde in the borehole; processing the data to obtain values for the required measurements; processing the measurements to derive values for formation parameters of interest; and generating real time displays indicative of selected operating parameters of the sonde, measurements and formation parameters. This variety and quantity of functions imposes a substantial burden on the computer system. Implementing computer systems to accomplish all the required tasks accurately and quickly enough to permit an acceptable logging speed to be attained has proven to be very difficult and time consuming.

The requirements of data acquisition and control described above are also encountered in other environments, for example in avionics and aerospace applications.

A particular problem is that the computer must provide data manipulation functions, which are essentially independent of the time and duration of the processing involved, and also process control functions, which are affected by the time and duration of processing. Thus, for example, the manipulation of data obtained from the sonde by applying a Fourier transform is a time-independent task: the same result for the transform output will always result from the same set of data values, irrespective of the time and duration of processing. In contrast the acquisition of data from the sonde is time-dependent: the actual value found by inspecting the last of a sequence of received items of data (which may affect subsequent control signals to be sent to the sonde) will depend upon the rate at which data items are sent uphole and the rate at which the sequence of data items coming from the sonde is inspected. Any change in the speed of processing in the downhole or uphole equipment can affect the result. Furthermore the rate of uphole transmission will typically be primarily dependent on the characteristics of the sonde, so the time of reception of each item of data at the surface cannot be controlled by the surface computer equipment. Likewise the characteristics of the sonde may require that commands be sent downhole at a rate sufficient to ensure optimum operation. The time-independent operations must not interfere with timely occurrence of these time-dependent functions, to avoid loss of data and failure to alter operation of the sonde promptly in response to changing conditions. Equally it is important to ensure that the time-dependent functions do not cause errors in the time-independent processing. These characteristics must be preserved despite any system modifications involving hardware (such as a change in processor clock rate) or software (such as addition of program modules).

Techniques such as interrupt processing are known for coordinating execution of multiple functions. However they must be applied with great care to ensure adequate speed of operation and avoidance of conflict in use of processor resources such as random access memory. This is especially the case with modern borehole logging operations, in which advanced measurement techniques generate large quantities of data using sondes that may require accurate control, and the cost of exploration demands that the logging be completed as quickly as possible. Consequently providing reliable, efficient and effective data processing systems to operate in such circumstances is a difficult and expensive task.

The problem becomes even more acute when several tasks are to be executed concurrently, either by means of time sharing of a single processor or with multiple processors operating in parallel.

Various arrangements are known for segmenting functions to be performed by computers and for coordinating the operating of multiprocessor systems. For example, in 'Coroutines and networks of parallel processes', by G. Kahn and D. B. MacQueen, Information Processing 77, International Federation of Information Processing Societies (1977), pp. 993-998, a system is described in which processes which can be executed concurrently and communicate with one another via 'channels'. The channels act as first-in first-out buffers carrying information in one direction only, from processes producing data to processes requiring data. A process requiring a data item can access the channel which connects it to the process producing the relevant sequence of items, whereupon it receives the next consecutive item in the sequence stored in the channel. Such a system is an example of a so-called data-flow architecture.

Another type of data-flow system is described in 'Performance analysis of a data-flow processor', by D. P. Misunas, Proceedings of the 1976 International Conference on Parallel Processing (1976), pp. 100-105; and in 'Applying data flow in the real world', by W. G. Paseman, Byte, McGrawHill, vol. 10, No. 5, (May 1985), pp. 201-214. Such systems communicate between processes by means of fixed size packets of data, and a process is not executed until all the items of data it requires to execute its function completely are available. The availability of all the required data items triggers the execution of the process, which does not have any control over whether it is then executed or to what extent. A similar data-flow system is described in U.S. Pat. No. 4,197,589 to Cornish et al, and a concurrent task and instruction processor is described in U.S. Pat. No. 4,229,790 to Gilliland et al.

It is an object of this invention to provide a system and method for processing data which facilitate implementation of time-independent and time-dependent operations jointly.

It is another object of this invention to provide a system and method which facilitates processing of data by means of a plurality of concurrently executing processes.

It is a further object of this invention to provide a system and method for processing data using a plurality of data processors.

SUMMARY OF THE INVENTION

According to one aspect of this invention there is provided a data processing system comprising: input means for receiving sequentially occurring data items to be processed by said system; processor means for concurrently executing a plurality of processes to generate additional sequentially occurring data items; means for associating data items with respective unique index values according to the source of each said item and its sequential position relative to other items received from the same source; data storage means for storing said data items; means for supplying any selected data item from said storage means to said processing means for use in execution of a process, said data item being selected in accordance with the associated index value determined during execution of that process; and output means for supplying data items resulting from execution of said processes.

According to another aspect of this invention there is provided a data processing system comprising: input means for receiving sequentially occurring data items to be processed by said system; processor means for concurrently executing a plurality of processes to generate additional sequentially occurring data items; means for associating said received and said additional data items with respective unique index values according to the source of each said item and its sequential position relative to other items received from the same source; data storage means for storing said data items; means for supplying any selected data item from said storage means to said processing means for use in execution of a process, said data item being selected in accordance with the associated index value determined during execution of that process and all exchange of data items between processes being performed via said supplying means; and output means for supplying selected data items resulting from execution of said processes, said data items being selected in accordance with the associated index values.

According to a further aspect of this invention there is provided a method of data processing, comprising the steps of: receiving sequentially occurring data items to be processed; concurrently executing a plurality of processes to generate additional sequentially occurring data items; associating data items with respective unique index values according to the source of each said item and its sequential position relative to other items received from the same source; storing said data items; and supplying any selected stored data item for use in execution of a process, said data item being selected in accordance with the associated index value determined during execution of that process.

According to yet another aspect of this invention there is provided a method of data processing, comprising the steps of: receiving sequentially occurring data items to be processed; executing a plurality of concurrent processes to generate additional sequentially occurring data items; associating said received and said additional data items with respective unique index values according to the source of each said item and its sequential position relative to other items received from the same source; storing said data items; supplying any selected stored data item for use in execution of a process, said data item being selected in accordance with the associated index value determined during execution of that process and all exchange of data items between processes being performed in this manner; and supplying as output of said data processing selected data items resulting from execution of said processes, said data items being selected in accordance with the associated index values.

BRIEF DESCRIPTION OF THE DRAWINGS

Additional objects and features of the invention will become more apparent upon consideration of the following detailed description of the invention, reference being had to the accompanying drawings in which:

FIG. 1 is a schematic diagram of a borehole logging operation in which the present invention can be advantageously used;

FIG. 2 is a block schematic diagram of a first embodiment of a data processor in accordance with the invention;

FIG. 4 is a block schematic diagram of a storage device for use in implementing the invention;

FIG. 5 is a block schematic diagram of another storage device for use in implementing the invention;

FIG. 6 is a block schematic diagram of a second embodiment of a data processor in accordance with the invention;

FIGS. 11 to 15 are flow diagrams illustrating procedures useful in implementing a data processor in accordance with this invention by programming a general-purpose computer.

DETAILED DESCRIPTION

Figure 3:
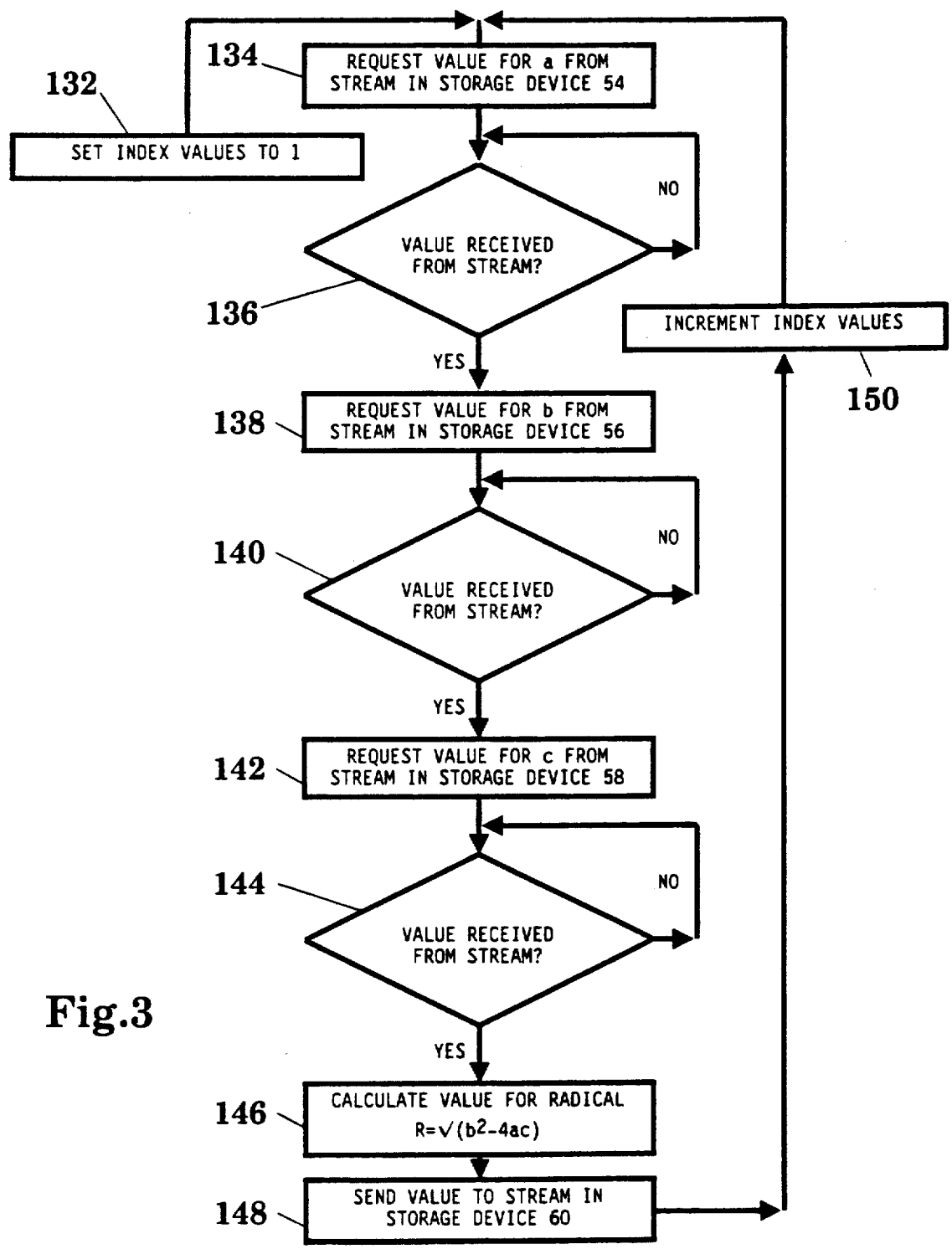
FIG. 3 is a flow diagram illustrating operation of central processing units forming part of the data processor of FIG. 2.

The data processing system and method of operation of this invention are not limited to any particular type of data processing. However they can be used to advantage for the concurrent execution of processes which must implement both time-independent functions, such as the arithmetical manipulation of data from measurement operations to derive additional information, and time-dependent functions, such as the real time control of a measuring device. An example involving both kinds of function is the operation of a borehole logging tool, as is schematically illustrated in FIG. 1.

Referring to FIG. 1, an elongate logging tool or sonde 10 is suspended on an armored multi-conductor cable 12 in a borehole 14 penetrating an earth formation 16. The sonde 10 is moved in the borehole 14 by paying the cable 12 out and then (while logging measurements are actually made) reeling it back in over a sheave wheel 20 and a depth gauge 22 by means of a winch forming part of a surface equipment 24. The depth gauge 22 measures displacement of the cable 12 over the sheave wheel 20 and thus the depth of the tool 10 in the borehole 14.

The tool 10 includes one or more transducers for measuring parameters of the formation 16, typically by means of electrical, acoustic or nuclear techniques. The transducers generate electrical signals related to the required parameters and these signals are suitably conditioned by processing and interface circuitry in the sonde 10 for transmission up the cable 12 to the surface equipment 24. The equipment 24 includes a data processor 26 and typically receives, decodes, amplifies and records the signals on chart and/or magnetic tape recorders as a function of the depth signals generated by the depth gauge 22. In addition the equipment 24 may process the data represented by these signals to yield indications of the required formation parameters which are also recorded. Further processing of these and other signals from the sonde 10 enables the surface equipment 24 to monitor the operation of the sonde 10 and generate signals which are transmitted down the cable 12 to control the sonde 10, for example to synchronize the operation of its component circuits or modify amplifier gain.

The precise details of the construction and operation of the sonde 10 and the apparatus for communicating signals between the sonde 10 and the surface equipment 24 are not part of the present invention, and, being well known to those skilled in the art, need not be described here. Likewise, the specific algorithms for processing the data received from the sonde 10 to derive values for formation parameters and control signals to be sent to the sonde 10 are not part of this invention and will not be described.

The data processor 26 has to accomplish two different kinds of processing. The first kind is essentially independent of the time at which it is carried out. Thus the derivation of the value of a required formation parameter from data received from the sonde 10 should always produce the same result, irrespective of when the derivation takes place.

The second type of processing is time-dependent. Thus, sensing the appearance on the cable 12 of an item of data sent uphole by the sonde 10, and the successful capture and recording of this data, are dependent on timely monitoring of the cable by the processor 26. Likewise the generation of command signals to be sent downhole to the sonde 10 must be accomplished at a rate that is adequate to achieve proper operation of the sonde 10 and adequate response to changing conditions.

These two types of processing can readily conflict with one another. An accurate derivation of a parameter value may take too much processor time, resulting in delayed or inaccurate generation of command signals and/or failure to detect and record data sent uphole. Likewise data reception and generation of command signals may interfere with evaluation of received data, by changing data values which are still required for other calculations. Furthermore, even when a program is functioning correctly it may not continue to do so upon transfer to a different kind of computer system operating at a different speed, or after modification to add one or more new program modules for example. Systems and methods for the operation of data processors which facilitate effective and appropriate programming to perform such tasks and alleviate these problems will now be described with reference to FIGS. 2 through 15.

In these Figures the data processing is represented for convenience as being performed by several central processing units (CPUs) operating in parallel, each CPU being dedicated to one task in the overall processing operation. However it should be understood that the invention can equally be implemented with one or more CPUs whose resources are shared between several different processes, each process corresponding to the task that would be performed by a dedicated CPU. The term concurrent processes is used herein to refer to two or more processes being executed with any of these arrangements. Such a process may be quite complex in itself, involving several hundred instructions. If there are two or more CPUs they can be distributed processing units connected by relatively low-bandwidth data links, or multi-processing units connected by relatively high-bandwidth links (for example sharing the same main memory).

Likewise the storage of data before and after processing by a CPU is represented for clarity as being divided among several separate storage devices. However a single large storage device could be used with appropriate division of its capacity among the different requirements for data storage. Techniques for implementing such sharing of processor and memory resources are known and need not be detailed here.

By way of example, FIGS. 2 and 3 relate to an arrangement for calculating the roots (that is the values of x which give y=0) of a quadratic equation $$y = ax^2 + bx + c$$

according to the formula $$x = \frac{-b \pm \sqrt{(b^2 - 4ac)}}{2a}$$

where a, b and c are input as coefficients. The number of CPUs their inputs and outputs and the configuration and interconnection of associated storage apparatus have been depicted accordingly. Obviously these details will vary depending on the particular use to which the processor is to be put.

Referring to FIG. 2, a data processor 30 is shown having three CPUs 32 through 36. Each CPU receives data items at one or more inputs and after processing supplies data items at one or more outputs. To this end the CPUs include arithmetic and logic circuitry, registers and instruction decoding circuitry in known manner. In addition it is assumed that each CPU has its own memory for storing the program of instructions controlling its operation and for storing data being manipulated in accordance with those instructions. Obviously the CPUs could share common memory resources for these purposes.

Data to be processed by the processor 30 (values for the coefficients a, b and c) are received on input lines 40, 42 and 44 which are coupled to inputs 46, 48 and 50 of a data store 52 containing storage devices 54 through 64. The storage devices 54, 56 and 58 have respective single inputs 66, 68 and 70 which are coupled to the inputs 46, 48 and 50 to receive the input data to the processor 30. The other storage devices 60 through 64 have respective single inputs 72, 74 and 76 and, as will be explained hereinafter, are used to store data resulting from processing by the CPUs 32 through 36. For clarity the input lines to the storage devices 54 through 64 are depicted by dotted lines to help distinguish them from other connections.

The data storage devices 54 through 64 may incorporate, for example, semiconductor random access memory or magnetic disk memory or a combination of both. As will be explained hereinafter the data storage devices do not have to be capable of writing new data values to locations in which data has previously been written. Thus it is also possible to incorporate memory which only allows a single writing operation at a given location. An example of such a memory is a laser disk store in which data is stored by using a laser beam to produce and subsequently read a permanent pattern of minute pits on the surface of a metal or metallized-plastic disk. Such stores are available from, for example, Optimem of Sunnyvale, California and Optical Disk Manufacturing Co. (a division of Alcatel Thomson) of Redondo Beach, California. Laser disk storage has the advantage of enabling an extremely large quantity of data to be stored in a relatively small physical space.

Each storage device 54 through 64 is arranged to receive data at its respective input 66 through 76 and store this data as a stream of successive data items. Each additional data item is added to the end of the stream after the previously received item. The length of the stream of data items can in principle grow without limit, though obviously there are constraints, imposed by the finite physical storage capacity of the storage devices, on the quantity of data that can be stored at any one time. Nonetheless, every new data item is treated as extending the length of the stream.

The term data item is used herein to describe any discrete information entity that is to be accessed independently of other items. Thus, depending on the application, a data item may be, for example, a single binary digit (one bit), an eight-bit byte, a sixteen- or thirty-two-bit word, a multi-byte value in representing a value in integer or floating- point format, a string of bytes encoding a string of alphabetic characters, or even an entire array of such values. A data item may itself be a value which serves as a pointer to the location of another data item in the store.

When a data item is added to the stream in a storage device it becomes associated with a unique index value according to its position within that stream. The index value of each data item is one more than the index value for the immediately preceding item in the same stream.

In the simple case illustrated in FIG. 2, in which each stream has its own dedicated storage device, this index value is simply the number of data items which have already been received by the storage device (assuming the first item has an index value of zero). In these circumstances no special action is required to assign the data item its index value. Furthermore, if the physical storage locations in the storage device have addresses starting at zero then the index value for a data item directly corresponds to the address of its location in the storage device. The storage device merely needs to maintain an indication of the next free storage location to which the next received data item should be written.

Instead of having an individual storage device dedicated to each stream of data, several streams of data may be stored in the same storage device. One possible approach is to treat the storage device as being partitioned into several segments, each segment being assigned to one stream. In such a case, it would also be necessary to maintain a record for each stream of the storage location containing the first data item of that stream. Then the storage location of any other data item in the same stream could be identified by adding the index value for that item to the address of the storage location containing the first item. Alternatively the data items for different streams can be intermixed. In this case a directory of storage locations associated with each stream could be maintained, or a linked list could be used, each stored data item having associated with it a pointer to the location of the next data item in the same stream. These techniques for management of shared memories are well known in the art.

The storage devices 54 through 64 may incorporate memories which permit over-writing of existing data with new data. If data items which are no longer required can be identified, so that their locations can be re-used, it is possible to continue appending new data items to a stream indefinitely, although the quantity of items in a storage device at any one time can obviously never exceed its capacity. One possibility to allow such re-use is to restrict choice of data items to be retrieved from the storage devices to those received no earlier than the data item most recently retrieved. Thus, assuming numerically increasing index values are assigned to data items as they are received by a storage device, the index values of items to be retrieved would not be allowed to decrease. Any locations containing data items with index values less than the index value for the last item retrieved from that storage device could be re-used. Techniques for managing finite memory resources to achieve this result are well-known, for example so-called garbage collection.

Even if a new data item physically re-uses the storage location of an earlier and now unwanted data item in this manner, the new item is associated with its own unique index value; the index value of the earlier, replaced item is never re-used. Nor is an existing data item ever altered. A substitution of one data item value for another is effected by writing a new data item, with its own unique index value, and using this data item instead of the earlier, superseded one.

If storage locations are re-used it is necessary to maintain a record of the index value of the earliest data item still being stored and the address of its physical location. The difference between this index value and the unique index value for any other data item can then be added to the address of the earliest item to derive the address of that other item.

If the store 52 incorporates a write-once memory such as the laser disk device described above, such re-use is impossible, so there need be no limitations on the index values of data items to be retrieved: index values for retrieval of data items can be incremented or decremented at will. Although the store 52 will eventually become saturated, its very high storage capacity permits a viable operating period of substantial duration before the storage medium has to be replaced or augmented.

Each storage device 54 through 64 has one or more outputs: the devices 54 and 56 each have three outputs 78, 80 and 82 and 84, 86 and 88 respectively; the device 58 has a single output 90; the device 60 has two outputs 92 and 94; and the devices 62 and 64 each have one output 96 and 98 respectively. Each such output is arranged to retrieve any data item in the stream stored in the associated storage device by reference to the index value of the required item. In the event that a data item is requested with an index value for which no data item has yet been received, the storage devices are arranged to wait until a data item is received for that index value and then return that data item in response to the request. If storage locations are being re-used the same method for identifying storage locations for data retrieval is used as for storing the data items, and the range of index values for which data is retrievable will be constrained as noted above.

Each of the storage devices 54, 56 and 60 is shown for clarity in FIG. 2 as having separate plural outputs which are also separate from the input. However, it will be understood that in a magnetic disk store, for example, the input and output functions may be implemented by appropriate control of a single read/write head. Likewise, if semiconductor memory is used, these functions would be provided by addressing circuitry in known manner.

Data items received by the data processor 30 via the input lines 40 through 44 are stored in the storage devices 54 through 58 respectively. All these data items (coefficients a, b and c) are to be used by the CPU 32, which accordingly has three inputs 100 through 104 coupled to the outputs 82, 84 and 90 of the storage devices 54, 56 and 58 respectively. A control line 106 from the CPU 32 to the output 82, drawn as a dashed line, enables the CPU to specify the index value of a data item (a value for the coefficient a) to be retrieved from the storage device 54 and supplied to the CPU 32 by the output 82. Similar control lines 108 and 110 to the outputs 84 and 90 enable the CPU 32 to specify the required data items (corresponding values for the coefficients b and c) to be retrieved from the storage devices 56 and 58. The CPU 32 is shown as producing a single stream of data items (values for an intermediate result known as the radical) which are supplied to the storage device 60 via its input 72.

The output 92 of the storage device 60 enables the CPU 34 to obtain these data items in accordance with the index values specified via a control line 112, together with data items from the storage devices 54 and 56 (corresponding values for the coefficients a and b) which are supplied by the outputs 80 and 88 under the control of control lines 114 and 116. The CPU 34 supplies data items resulting from the process it executes to the storage device 62 via the input 74. These data items are the values for one root of the quadratic equation, for the corresponding values of the coefficients a, b and c. The CPU 36 similarly receives data items from the storage devices 54, 56 and 60 via outputs 78, 86 and 94 as specified via control lines 118, 120 and 122, and supplies resulting data items to the storage device 64 via the input 76. These data items are the values for the other root of the quadratic equation for those coefficient values.

Finally, the data items in the storage devices 62 and 64 are supplied by the outputs 96 and 98 to output lines 124 and 126 of the data processor 30 in accordance with index values specified via control lines 128 and 130.

The identity of the stream from which a data item is to be retrieved may or may not need to be explicitly specified, depending of the arrangement of the store and the format of the index values. Thus in the configuration of FIG. 2 the required stream is inherently identified by the physical selection of the appropriate control line 106 through 122, 128 or 130. If memory is shared between several streams, the stream identity could be encoded into the index value, thereby giving each stream its own distinctive set of index values. Alternatively, the index values may be similar for each stream and the stream identity can be supplied as a parameter with the index value when a data item is requested.

The process executed by each of the CPUs 32 to 36 is summarized in FIG. 3, which relates specifically to the CPU 32. The operation of the CPUs 34 and 36 is similar.

Referring to FIG. 3, the index values for data items to be supplied to the CPU 32 must be initialized when the process is first started. This is represented by the step 132. The CPU 32 then requests a data item for the coefficient a from the storage device 54, according to the current index value, at step 134. At step 136 the CPU 32 checks whether a data item has been received. If not the process loops repeatedly through step 136 until a data item is received. When a data item has been received, the process continues to step 138, where a corresponding data item for the coefficient b is requested from the storage device 56, and then loops through step 140 as necessary until a data item is received. This sequence of request and loop is repeated a third time at steps 142 and 144 to obtain a corresponding data item for the coefficient c from the storage device 58.

When data items for all three coefficients have been obtained the CPU 32 proceeds to step 146 where it calculates the corresponding value for the radical R according to the formula $$R = \sqrt{(b^2 - 4ac)}$$

This value is supplied as a data item to the storage device 60 at step 148, where it receives a unique index value corresponding to those for the data items retrieved at steps 134, 138 and 142.

The CPU 32 continues to step 150 where the index values to be specified in retrieving data items from the storage devices 54 through 58 are incremented, and then re-enters step 134 to repeat the sequence for the next set of coefficients a, b and c.

The operation of the CPUs 34 and 36 is very similar, but the data item requested at step 142 is obtained from the storage device 60. For the CPU 34 the calculation performed at step 146 is according to the formula $$x = \frac{-b + R}{2a}$$

and the result is supplied as a data item at step 148 to the storage device 62. In the case of the CPU 36, the calculation performed at step 146 is according to the formula $$x = \frac{-b - R}{2a}$$

and the result is supplied as a data item at step 148 to the storage device 64.

As is illustrated by FIG. 2, every process executed by any of the CPUs 32 through 36 supplies data items to a storage device dedicated to storing data items from that process. Though the processes illustrated in FIG. 2 each have only one output, a process can of course generate two or more outputs, in which case each output would have its own dedicated stoarge device. Every process receives data items solely from one or more of the storage devices 54 through 60, through any one storage device may supply data items to two or more processes. Consequently, the only means of communication between processes is by way of the storage devices 54 through 60. This feature provides significant advantages. All data transfers to and from processes are buffered by way of the streams of data items in the storage devices. Thus synchronization between processes is inherently provided by the streams, and without any explicit provision for this being required in the processes themselves. A process can add a data item to a stream without waiting for any other process to read it. Each process can request data items as and when required, and the arrival of a data item does not force execution of any process which may use that item. Since index values are never re-assigned to new data items and data items are never altered, a data item is always available to a process, within the constraints imposed by finite storage capacity. Within those same constraints a process can request any data item in a stream, and is not limited to receiving items in a predetermined sequence. Nonetheless there is no risk of processes receiving data items in an incorrect order.

Also, in the embodiment shown in FIG. 2, the only means of communication between processes executed by the CPUs 32 through 36 and the input and output of the overall data processor 30 is by way of storage devices in the store 52 (namely the storage devices 54, 56, 58, 62 and 64). This may be desirable but is not essential.

The processing functions depicted in FIGS. 2 and 3 are purely time-independent. In particular, the values obtained upon retrieval of data items from the storage devices 54 through 64 are independent of the time of occurrence of the items retrieved. The implementation of time-dependent functions involves additional retrieval functions, such as those illustrated in FIGS. 4 and 5.

FIG. 4 shows a storage device 150 with additional circuitry to enable retrieval of the most recently received data item in the stream stored in the device 150, without the index value for that item being specified by the CPU or process requesting the item. A control line 152 from the CPU is coupled to a register 154, which is updated with the index value of the most recently received data item via a connection 156 from the storage device 150 as each data item is received on an input line 158. The register 154 is in turn coupled to an output 160 of the storage device 150. Thus when a request for a data item is received on the line 152, it is transmitted to the output 160 by the register 154 together with the index value of the most recently received item, that is the value currently held in the register 154. The data item retrieved is supplied via an output line 162.

FIG. 5 shows a storage device 164 with additional circuitry to enable attempted retrieval of a data item with a predetermined limit on the time for which the storage device waits if there is no data item having the specified index value. A control line 166 is coupled directly to an output 168 of the storage device 164 to indicate the index value of the data item to be retrieved, and is also coupled to a trigger input T of a monostable circuit 170. An output line 172 supplies any data item retrieved, and is also coupled to a clear input of the monostable circuit 170. A set output of the monostable circuit 170 is coupled to a timeout signal line 174 and also to the output 168. When a data item is requested via the control line 166 the request is supplied to the storage device 164, and at the same time the monostable circuit 170 is triggered to enter its quasi-stable state for a predetermined time period. If the requested data item is in the storage device 164, or is received before the expiry of the predetermined time period, it is supplied via the output line 172, thereby clearing the monostable circuit 170 before it reaches the end of its quasi-stable period. However, if the requested data item does not become available before the expiry of the predetermined time period, the monostable circuit 170 times out, thereby generating a signal on the timeout line 174. This signal indicates to the requesting CPU or process that the timeout has occurred, and also cancels the outstanding request at the output 168 of the storage device 164. If desired the monostable circuit can have a variable quasi-stable period determined in accordance with a value specified by the requesting CPU on the control line 166 when a data item is requested. The design of circuitry to implement such a function will be evident to those skilled in the art.

A second data processor in accordance with the invention will now be described with reference to FIG. 6. This processor uses the retrieval operations described above with reference to FIGS. 4 and 5 to implement a time-dependent function in the form of the control of the speed of, and acquisition of data from, a sensor traveling along a trajectory (e.g. a logging sonde being winched up a borehole). The sensor generates data items once every two seconds, and its speed is signaled every tenth of a second. The processor checks that data items are continuing to arrive from the sensor, and terminates the operation of the sensor if data is interrupted for a period exceeding a preset time limit.

Referring to FIG. 6, data items from a sensor are received by the processor, indicated generally at 175, on a line 176 and supplied to a data storage device 178 in a data store 180. Data items indicative of the speed of the sensor are received in a line 182 and supplied to another data storage device 184. This storage device has an output 186 arranged to provide a read-latest function as described above with reference to FIG. 4. This output supplies the most recent data item indicative of the sensor speed to a CPU 188, which also receives data items from an output 190 of the storage device 178 and supplies data items resulting from its processing to a storage device 192. Another output 194 from the storage device 178, with a timeout function as described with reference to FIG. 5, supplies sensor data items to a second CPU 196, the output of which is coupled to a storage device 198. Outputs 200 and 202 of the storage devices 192 and 198 respectively are coupled to a third CPU 204, which feeds data items to a storage device 206. A fourth and last CPU 208 receives sensor data items from the storage device 178 via an output 210 thereof, and supplies data items to a storage device 212. The storage devices 206 and 212 supply data items as output signals from the data processor 175 via outputs 214 and 216 respectively and output lines 218 and 220 respectively.

Figure 7:
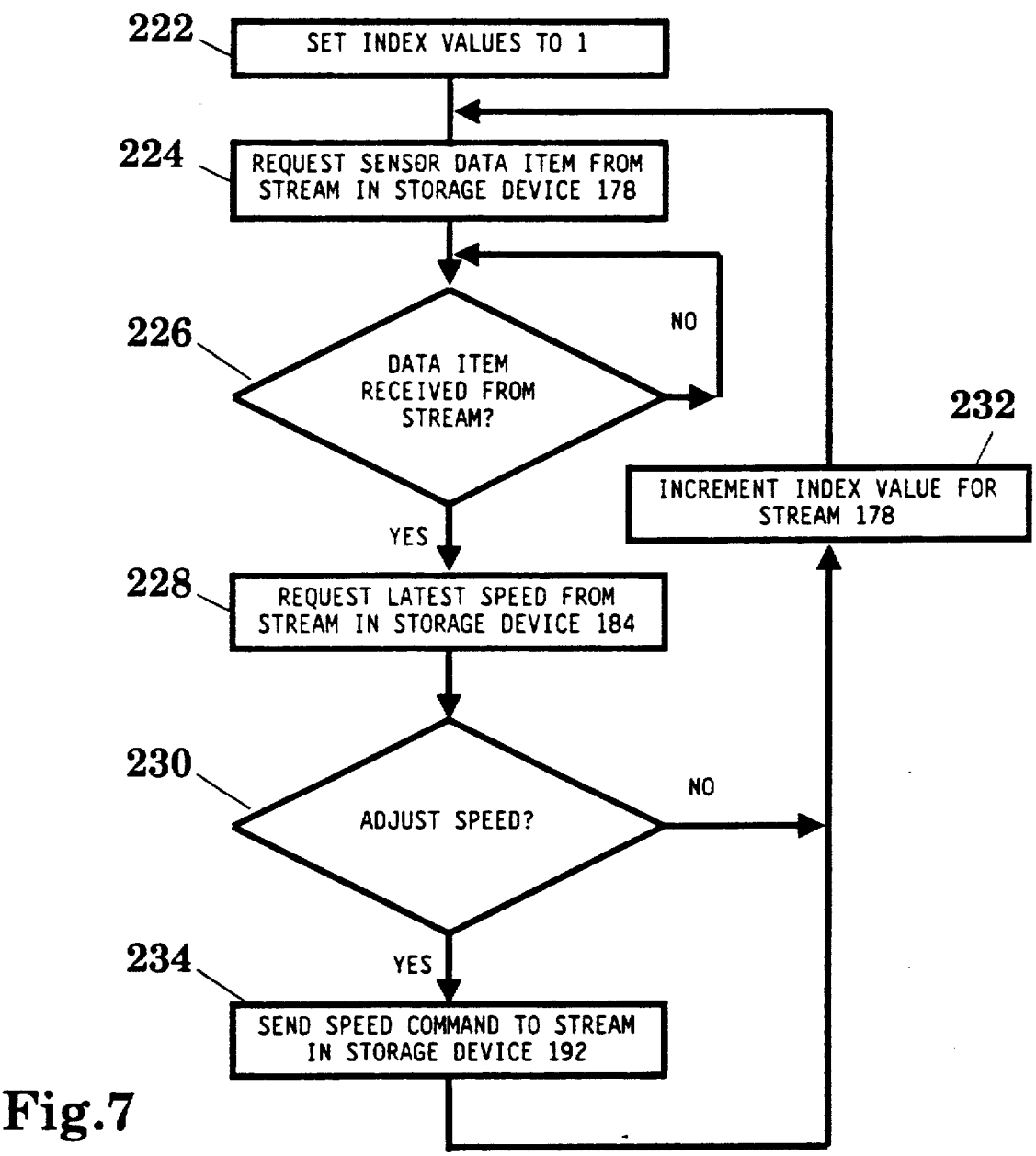
FIGS. 7 to 9 are flow diagrams illustrating operation of central processing units forming part of the data processor of FIG. 6.

The operation of the CPU 188 is illustrated by the flow diagram in FIG. 7. When operation of the processor 175 commences, the index values for data items to be retrieved from the storage devices 178 and 184 are initialized at step 222. The CPU 188 then enters a loop starting at step 224, where a sensor data item is requested from the storage device 178. Since the sensor supplies data items only once every two seconds, there will initially be no data item at the location corresponding to the index value specified by the CPU 188 in making the request. Accordingly when the CPU 188 progresses to step 226 to determine if a data item has been received from the storage device 178, the result will initially be negative. The CPU 188 therefore loops back to re-enter step 226, and continues to do so until a data item is received. Thereupon the CPU 188 advances to step 228, where it requests the latest speed data item from the storage device 184. Since speed data items are received ten times per second there will already be data items in the storage device 184 even when the first request is made. Therefore there is always a latest value available, and the request is fulfilled immediately. The CPU 188 continues to step 230 to determine whether the speed of the sensor needs to be adjusted. This determination can be made according to any suitable algorithm, and, since it forms no part of the invention, need not be described here. If no change is necessary, the CPU 188 returns to repeat the loop starting at step 224, via step 232 where the index value for use in requesting data items from the storage device 178 is incremented. If a change is required, an appropriate command is sent to the storage device 192, at step 234, and then the CPU proceeds to step 232 as above.

Figure 8:
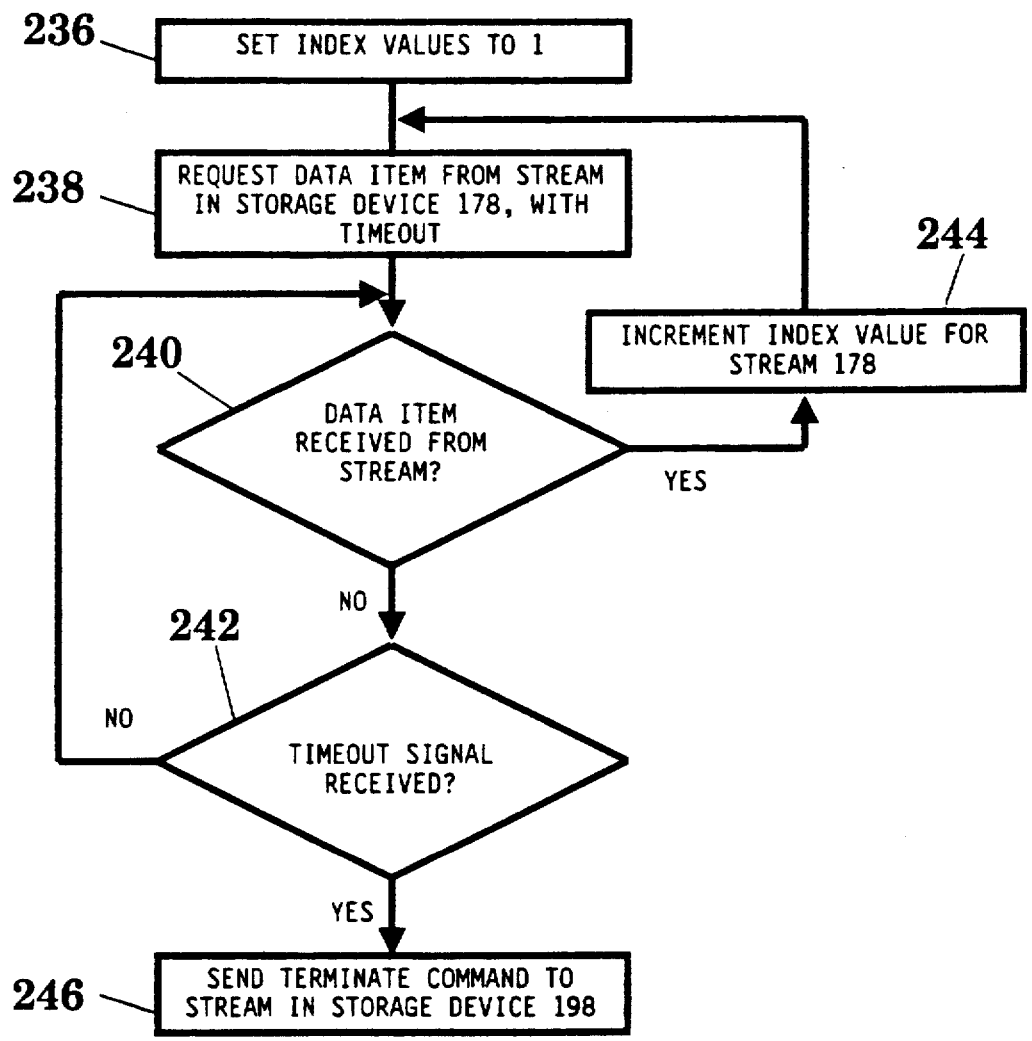

The operation of the CPU 196 is indicated by the flow diagram in FIG. 8. Index values are initialized at step 236 when the processor 175 commences operation. Then the process advances to step 238 to request a data item from the storage device 178, with a specified time limit. As for the retrieval of data items by the CPU 188 in step 224 of FIG. 7, there will be an interval before a data item becomes available in response to the request. During this interval, the CPU 196 loops through two decision steps 240 and 242. In the first of these steps the CPU 196 checks whether a data value has been received. If so, the CPU 196 proceeds to step 244 where it increments the index value for retrieval from the storage device 178 and then returns to step 238.

If the result of step 240 is negative, the CPU 196 proceeds to step 242, where it checks whether a timeout signal is being received from the output 194 of the storage device 178. If no such signal is present, the time limit for interruption of data from the sensor has not been exceeded, so the CPU 196 repeats the decision steps 240 and 242. However, if a timeout signal is received, then the CPU 196 continues instead to step 246, where it sends a command to the storage device 198 to terminate sensor operation.

Figure 9:
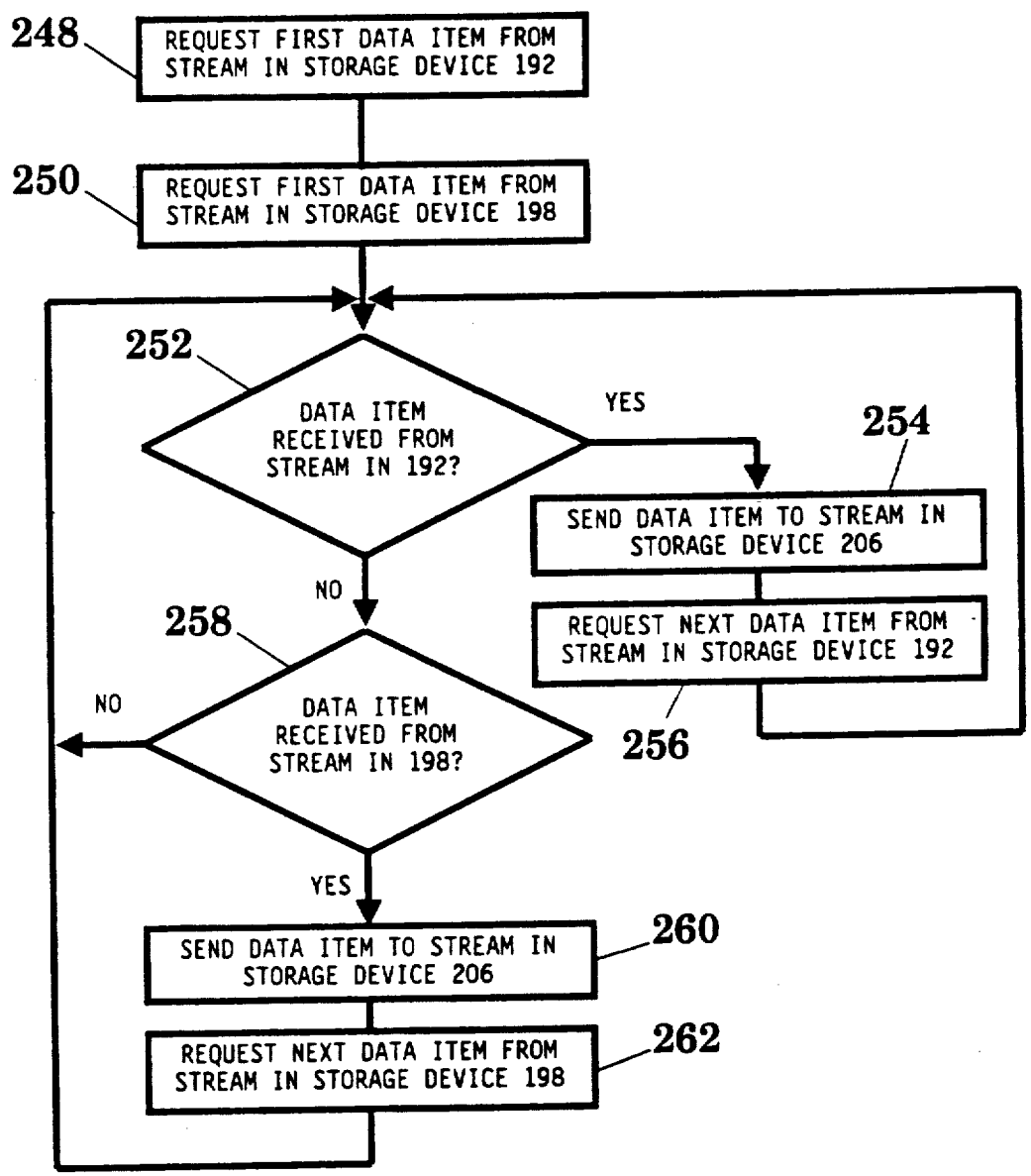

As shown in FIG. 9, the CPU 204 initially requests data items from both the storage devices 192 and 198, at steps 248 and 250. It then checks whether any item has been received from the storage device 192, at step 252. If so, it sends the data item received to the storage device 206, at step 254, renews the request for a data item from the storage device 192, at step 256, and returns to step 252. If not, it proceeds to step 258 to check for receipt of a data item from the storage device 198. In the absence of a data item it repeats the checking loop by returning to step 252. Otherwise it sends the data item received to the storage device 206, at step 260, renews the request for a data item from the storage device 198, at step 262, and returns to step 252. The effect of the process implemented by the CPU 204 is to merge the commands generated by the CPUs 188 and 196 in the order in which they are generated, and transmit them to the storage device 206 to be supplied as an output of the processor 175 via the line 218. This process is an example of a time-dependent process, since the precise sequence of commands appearing in the storage device 206 varies with the conditions encountered by the sensor (e.g. borehole condition) and its resulting behavior.

Another way of merging two sets of commands in a time-dependent manner would be to provide two inputs to a storage device, with each series of commands being added to the stream in the storage device via a respective input.

The CPU 208 simply takes sensor data items from the storage device 178 and applies appropriate processing to them to yield desired information which is then output to the storage device 212. This processing may take a variety of forms, such as arithmetical manipulation or combination with other data. The details of such processing are irrelevant to the present invention, and need not be discussed further.

As is the case for the processor 30 of FIG. 2, all communication of data between processes being executed by the CPUs is mediated by streams of data items held in the storage devices, and every data item is associated with a unique index value in its stream.

When separate CPUs are used for each process, this arrangement has the advantage that time-independent operations (such as the manipulation of sensor data by the CPU 208) and time-dependent operations (such as the monitoring of sensor speed by the CPU 188) can be implemented in separate processes without concern as to possible adverse interactions between them. This facilitates the design and writing of efficient, effective and reliable programs and their maintenance. Furthermore no consideration need be given to the particular details of the hardware intended to run the programs. Likewise no special provision need be made for the possibility of subsequent modifications to the hardware, use of different hardware or changes to the programs implementing the processes.

Thus, the manipulation of data by the CPU 208 can proceed at whatever rate is appropriate, depending on the complexity of the manipulation and the speed of the CPU 208, without risk of sensor data items awaiting manipulation being lost or overwritten owing to execution of other processes. These data items remain available in the storage device 178 to be retrieved via the output 210 as required by the CPU 208, irrespective of whether they have previously been retrieved via the outputs 190 and 194 by the CPUs 188 and 196. Similarly, the output data resulting from such manipulation can be generated by the CPU 208 at a rate independent of the rate at which the data is extracted via the output line 218 without risk of loss of data before it is extracted.

The time-dependent process executed by the CPU 188 can be implemented to monitor and control the speed of the sensor at whatever rate is considered desirable, and data items can be extracted from the storage device 178 via the output 190 accordingly. This process will function independently of the execution of data manipulation functions in the CPU 208, without the possibility of delays or timing problems being introduced by that manipulation. It is therefore unnecessary to consider timing conflicts when programming the process.

If the processor is implemented with a single CPU shared between several processes, there is likewise no risk of corruption of data required for time-independent processes owing to execution of time-dependent processes. The possibility of delays to time-dependent processes does exist, but the segmentation of processes with communication between them occurring solely via streams of data items facilitates the analysis of the operation of such as processor and the identification and rectification of potential conflicts. In addition it is believed that this architecture provides an effective structure within which to implement techniques for expressing timing constraints that enable timing conflicts to be avoided.

In addition the present invention assists the design of systems which can initially be implemented with a single CPU but then transferred to a multiple-CPU system without significant modification.

Although it is not necessary to divide time-dependent and time-independent functions between different processes, it is generally considered good practice to do so, and helps reduce the risk of timing conflicts or difficulties with subsequent modifications.

Preferably all communication between the processor 175 and the outside world is mediated via additional streams of data items, as shown in FIG. 6. However, if desired one or more processes may exchange data directly with other equipment. Such exchange will then be typically be time-dependent in nature, that is the results may depend upon execution speed for example.

Figure 10:
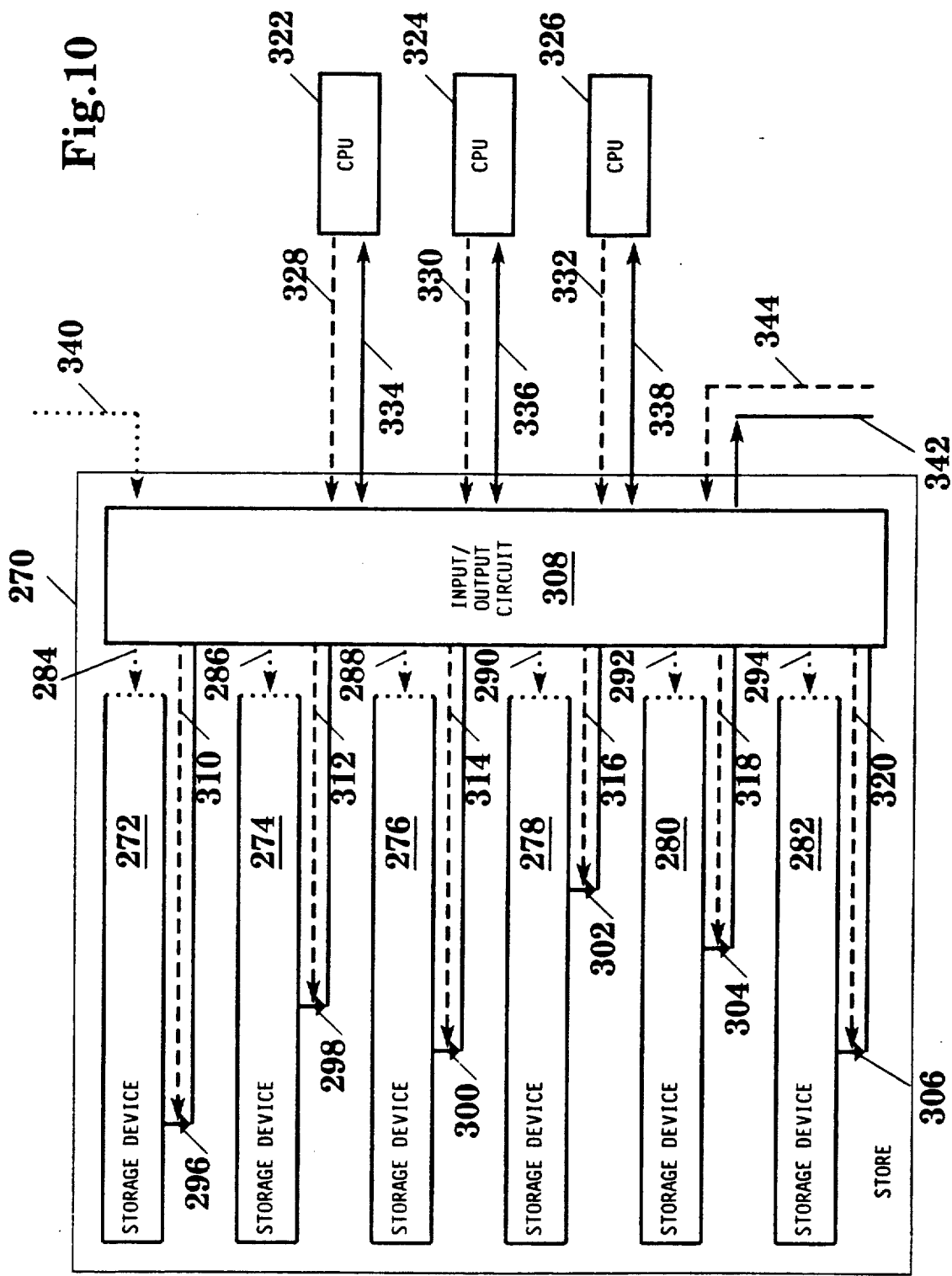
FIG. 10 is a block schematic diagram of an alternative implementation of the data processors shown in FIGS. 2 and 6.

The processors 30 and 175 of FIGS. 2 and 6 have individual connections between each CPU and the storage device(s) with which data items are communicated. Alternatively, as shown in FIG. 10, such connections can be multiplexed. Referring to FIG. 10, a store 270 has six storage devices 272 through 282, each of which has a respective input 284 through 294 and a respective single output 296 through 306. Each of these inputs and outputs is connected to an input/output circuit 308, together with a respective control line 310 through 320 associated with each output 296 through 306. Three CPUs 322 through 326 are coupled to the input/output circuit 308 by respective control lines 328 through 332 and two-way data lines 334 through 338. An input line 340 and an output line 342 and associated control line 344 are also coupled to the input/output circuit 308.

In operation, the CPUs 322 through 326 obtain data items from the storage devices 272 through 282 by sending signals to the input/output circuit 308 via the control lines 328 through 332. These signals identify the storage device from which a data item is required and the index value for the required item. The input/output circuit 308 routes the request, including the index value, to the storage device thus identified via the appropriate control line 310 through 320. The data item requested is returned by the storage device via the respective output 296 through 306 to the input/output circuit 308, which forwards it to the CPU which made the request, via the appropriate data line 334 through 338. Data items generated by the CPUs 320 through 326 are supplied to the input/output circuit 308 via the respective one of data lines 334 through 338, together with a signal on the corresponding control line 328 through 332 identifying which of the storage devices 272 through 282 should receive the data item. The input/output circuit 308 routes the data item to the storage device thus identified by supplying it to the appropriate one of the inputs 284 through 294.

The input/output circuit 308 likewise supplies input data received on the input line 340 to the appropriate one(s) of the storage devices 272 through 282, and supplies data items on the output line 342 in accordance with requests conveyed via the control line 344.

As shown in FIG. 10, each storage device 272 through 282 need have only one output 296 through 306, irrespective of how many CPUs require data items from any one storage device. The input/output circuit 308 is arranged to maintain, for each storage device 272 through 282, a record of the length of the stream of data items in that storage device and the index value of the data item most recently retrieved for each CPU requiring data items from that storage device. If the store 270 shares memory among several streams of data items as explained above, the input/output circuit 308 maintains a record of the physical locations of the data items comprising each stream. Likewise, if read/write memory is used, the input/output circuit also controls the re-use of storage locations as the data items they contain become unwanted for further processing. The implementation of these functions using known techniques for managing memory resources will be readily apparent to those skilled in the art.

One possible embodiment of the input/output circuit includes two blocks of random access memory and two registers. One of the registers is used for exchanging control and status information between the input/output circuit and a CPU, and the other register is used for transferring data items and index values. A first block of random access memory is configured as a set of tables, each table having sixty-two pairs of sixteen-bit entries and two thirty-two bit entries and being used to hold the details of up to sixty-two pending requests for data items from one storage device. One of the thirty-two bit entries is used to store the index value of the data item most recently added to the stream of items in that storage device. The other thirty-two bit entry stores the physical address of the location in the storage device containing that data item. The first entry in each pair of sixteen-bit entries contains an offset from the index value for the most recently added data item to the index value of a data item requested by a CPU. The second entry in the pair identifies the CPU or process requesting that data item. One megabyte of random access memory arranged in this manner can provide the functions of up to sixty-two outputs on each of four thousand and ninety-six storage devices.

The second block of random access memory is configured as one thousand and twenty-four groups of four entries each, and is used as a first-in first-out buffer for data items retrieved in response to requests from CPUs or processes. The first entry in each group is a sixteen-bit value identifying the CPU or process making the request. The second entry is a twelve-bit value identifying the storage device or stream from which the value was requested. The third entry is used to store the data item itself, in this case thirty-two bits long. The fourth entry is a four-bit status value. With this configuration, the buffer requires eight kilobytes of random access memory. The storage devices themselves can be implemented to store up to five hundred and twelve data items each thirty-two bits long for each of the four thousand and ninety-six streams, requiring another eight megabytes of random access memory.

A CPU can perform a write operation by placing the data item to be stored in the data transfer register of the input/output circuit, and the identify of the destination stream in the control and status register together with a code indicating that a write operation is required. The input/output circuit takes the value in the data transfer register and appends it to the stream of data items in the storage device identified in the control and status register. The pending request table for that stream is then updated by incrementing the entries for the index value of the most recently added data item and the physical location of that item. In addition the offset entries for requested data items in each of the sixty-two pairs of entries in the same table are decremented. If any offset becomes zero, and the paired process identifier is non-zero, then the data item just added has an index value for which a data item has been requested. In this case the data item, the process identifier and the identity of the stream are added to the buffer of retrieved data items, and the process identifier in the pending request table is set to zero to indicate that the request has been fulfilled.

A CPU or process requests a data item from the input/output circuit by placing the identity of the stream containing the item and its own identity in the control and status register and the index value of the required item in the data transfer register. An unused pair of entries in the pending request table for the identified stream is updated with the offset of the item from the index value of the item most recently added to the stream, and with the identity of the requesting process. The next retrieved data item in the buffer is then placed in the data transfer register, and the process identifier and the stream identifier in the associated entries in the buffer are placed in the control and status register. The process thus identified can then retrieve the data item from the input/output circuit. If one or more CPUs are being shared by processes, the process whose request is added to the table of outstanding requests is suspended, as described below, and the process identified in the control and status register reactivated.

It will be noted that with this arrangement a pending request for a data item can be canceled by setting the process identity entry in the table of pending requests to zero.

As an alternative to the use of special purpose hardware, a data processor in accordance with this invention can also be implemented by appropriately programming a general-purpose computer to provide the storage functions and processing functions described above. FIGS. 11 through 15 are flow diagrams illustrating, by way of example, ways in which the various read and write functions described above can be provided.

These Figures assume the existence of basic memory management and process execution operations, such as writing to and reading from memory, garbage collection, and suspending and reactivating execution of a process. Such operations form an integral part of, for example, the Interlisp-D programming environment available from Xerox Corporation, Pasadena, Calif. and described in the 'Interlisp Reference Manual', published in October 1983 by Xerox Corporation.

Each function is described in the form of a subroutine that can be called by a process needing to execute that function. When such a call occurs, the calling process temporarily transfers control to the subroutine. Thus, if the subroutine includes a step to suspend execution until another event reactivates it, the effect will be to suspend execution of the calling process as well.

FIG. 11 shows a procedure for reading a data item from a stream for a specified index value in response to a request from a process. The procedure is entered at 350 and first checks whether a data item is available for the index value requested, at step 352. This can be done, for example, by comparing the index value with the current length of the stream. If a data item is present, the procedure advances directly to step 354 where the data item is obtained from memory and supplied to the requesting process, after which the procedure returns to the calling process at 356. If the requested data item is not available (that is, no data item for that index value has yet been received), the procedure moves to step 358. At this step the index value and the identity of the requesting process are added to a table associated with the stream of data items for holding details of requests which are pending in respect of that stream. This table is essentially of group of memory locations reserved in advance for this purpose, for example in the form of an array, and is similar to the pending request table described above in relation to the input/output circuit of FIG. 10. The procedure then advances to step 360 where the execution of the procedure is suspended (using the SUSPEND PROCESS operation of Interlisp-D for example) until a data item is added to the stream, whereupon the execution of the procedure is reactivated as described below. Thereafter the procedure moves to step 354 as explained above.

A procedure for writing a data item to a stream is shown in FIG. 12. Referring to FIG. 12, the procedure is entered at 362 and commences with step 364, where the data item is stored in memory. This can be implemented in Interlisp-D by means of the CONS operation. At the next step, 366, a counter indicating the length of the stream of data items is incremented by one, and then the table of pending requests for that stream is checked at step 368 for any requests in respect of the index value equal to the new stream length. If there are no such requests, the procedure moves directly to step 370, where the earliest data item that has been read from that stream is identified, and then to step 372 to delete all data items with earlier index values. This step can be implemented in Interlisp-D by means of the RPLACD operation. These two garbage collection steps release for re-use the memory locations occupied by data items which have become unwanted, and are appropriate when limited capacity read/write memory is being used. It will be understood that they can be omitted if write-once memory is being used. After step 372 the procedure returns to the calling process at 374.

If one or more pending requests are found at step 368, the procedure advances to step 376 where the entry in respect of each request found is inspected. If it includes a reference to a timer function, as described below in relation to FIG. 13, that timer function is canceled. Likewise if it includes the identity of another stream with a pending request, as described below in relation to FIG. 14, that pending request on that stream is removed. Then the entry for each request found at step 368 is removed from the table. The procedure continues to step 378 where the process or processes which requested the data item for that index value are reactivated (in Interlisp-D this can be done with the WAKE PROCESS operation). Thereafter the procedure carries out the garbage collection at steps 370 and 372 before returning at 374.

Figure 13:
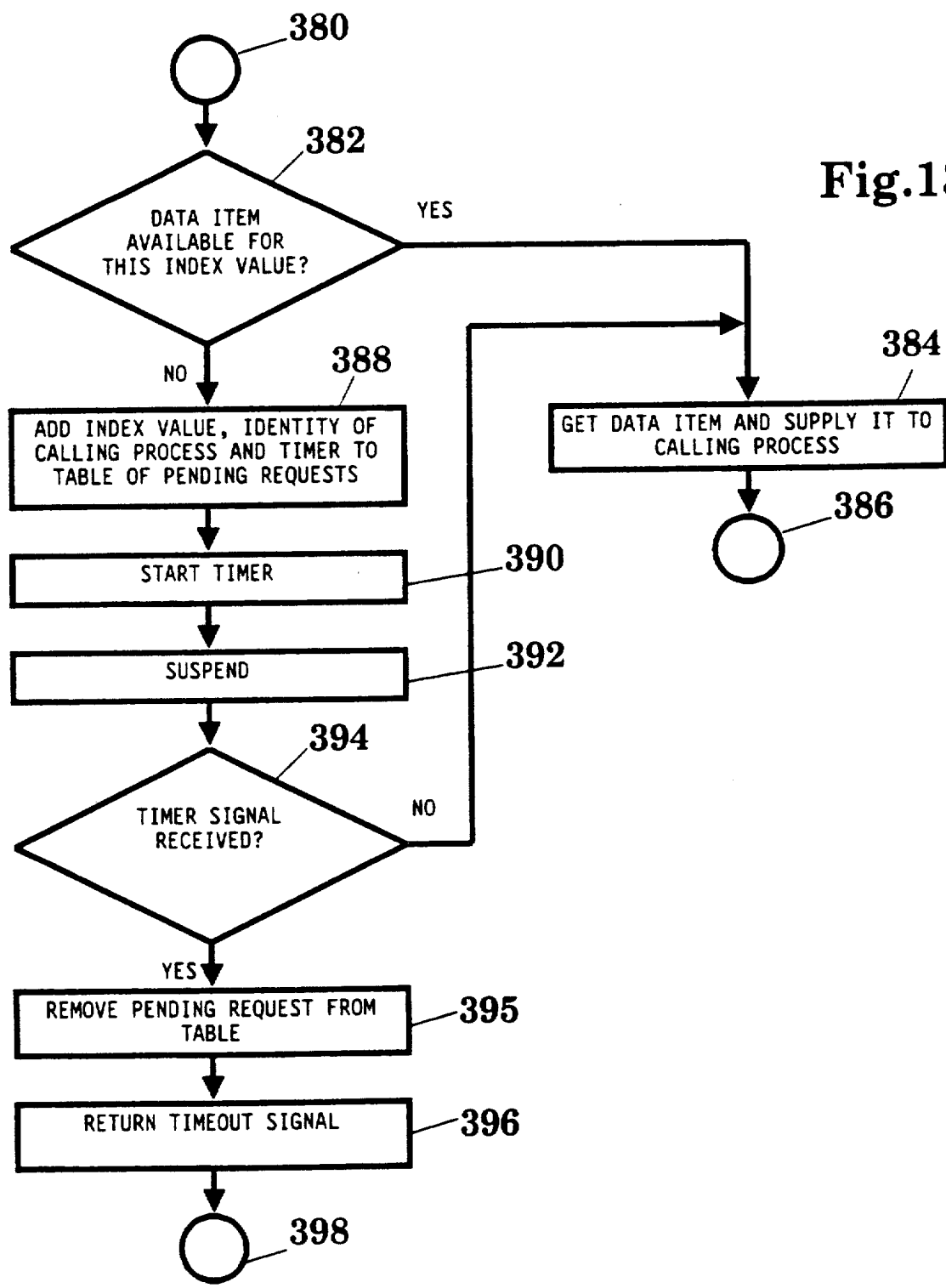

Referring now to FIG. 13, a procedure for implementing a read function with a timeout is entered at 380. At step 382 a check is made as to whether a data item is already available for the index value requested. If so, the data item is obtained from memory at step 384 and supplied to the requesting process, to which the procedure returns at 386. Otherwise the index value and the identity of the requesting process are added to the pending request table for that stream, at step 388. To this extent, the procedure is the same as steps 350 through 358 of the normal read procedure illustrated in FIG. 11. However, in this case a timer function is also set up for the required interval before a timeout signal is to be generated. Its identity is added to the pending request table, and another table is associated with the timer to indicate the interval that should elapse before a timeout signal is generated, the identity of the requesting process and the identity of the stream from which the data item was requested. At step 390 the timer is started and at step 392 the procedure is suspended. When the procedure is subsequently reactivated, a check is made at step 394 as to whether the reactivation has occurred because the timer has produced a signal indicating that the specified interval has elapsed. If so the request added to the pending request table at step 388 is removed at step 395, a timeout signal is generated at step 396 and the procedure returns to the calling process at 398. Otherwise the reactivation must have been caused by the receipt of a data item for the index value requested, in which case the procedure moves to step 384 to obtain and supply the data item as described above.

Figure 14:
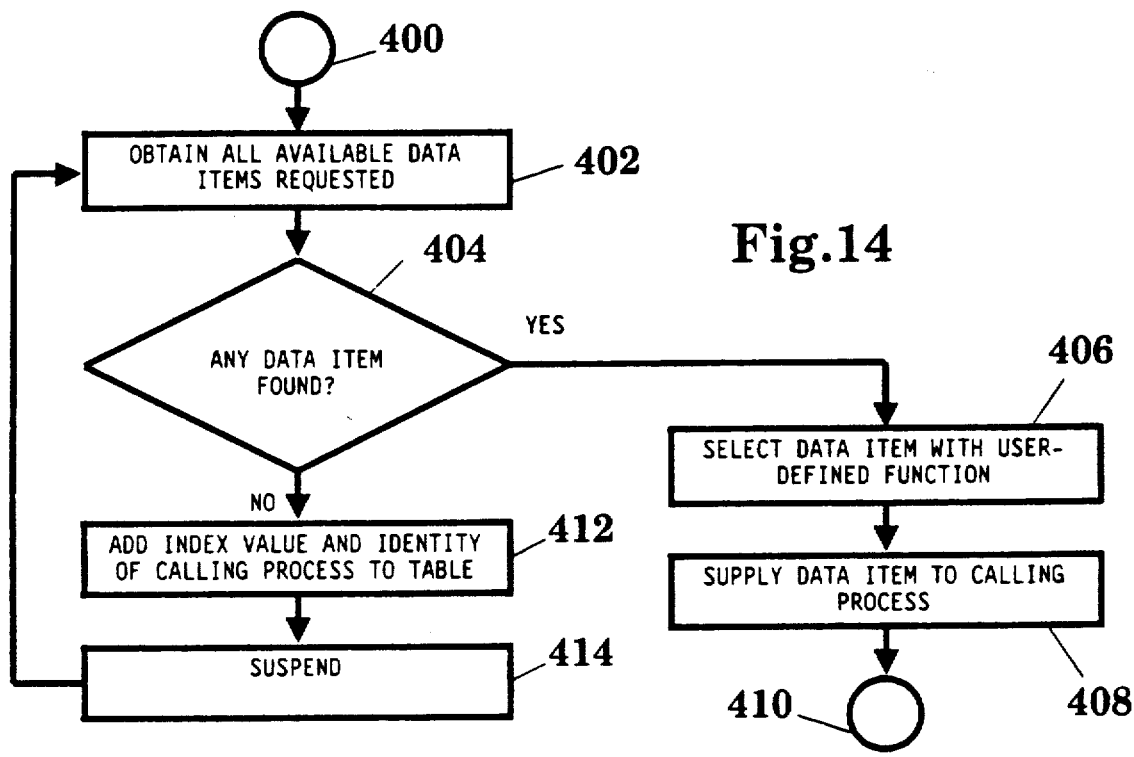

FIG. 14 shows a flow chart of an implementation of a read with arbitration function, for obtaining data items from several streams and combining them in accordance with some predetermined arbitration algorithm. This may be used, for example, in place of the process executed by the CPU 204 in the data processor 175 shown in FIG. 6, in order to merge the streams of data items in the storage devices 192 and 198.

Referring to FIG. 14, the procedure is entered at 400 and starts at step 402 by attempting to obtain a data item from each of the streams identified by the requesting process. At step 404 the procedure checks whether any data item has been found. If so, the procedure goes directly to step 406 where one data item is selected in accordance with a predefined arbitration function. This function might for example choose a data item from one stream in preference to that from another. The procedure supplies the chosen data item to the calling process at step 408 and returns control to it at 410. If no data items are obtained at step 402 the procedure advances to step 412 where the index value and identity of each calling process is added to the pending table for each associated stream. In addition, the entry in each table includes the identity of every other stream for which a request is pending. Thereafter the procedure suspends operation at step 414 until a requested data item becomes available, thereby reactivating the procedure as noted above. The procedure for reading the latest value received on a item which is now available and continues to step 406 as already described.

Figure 15:
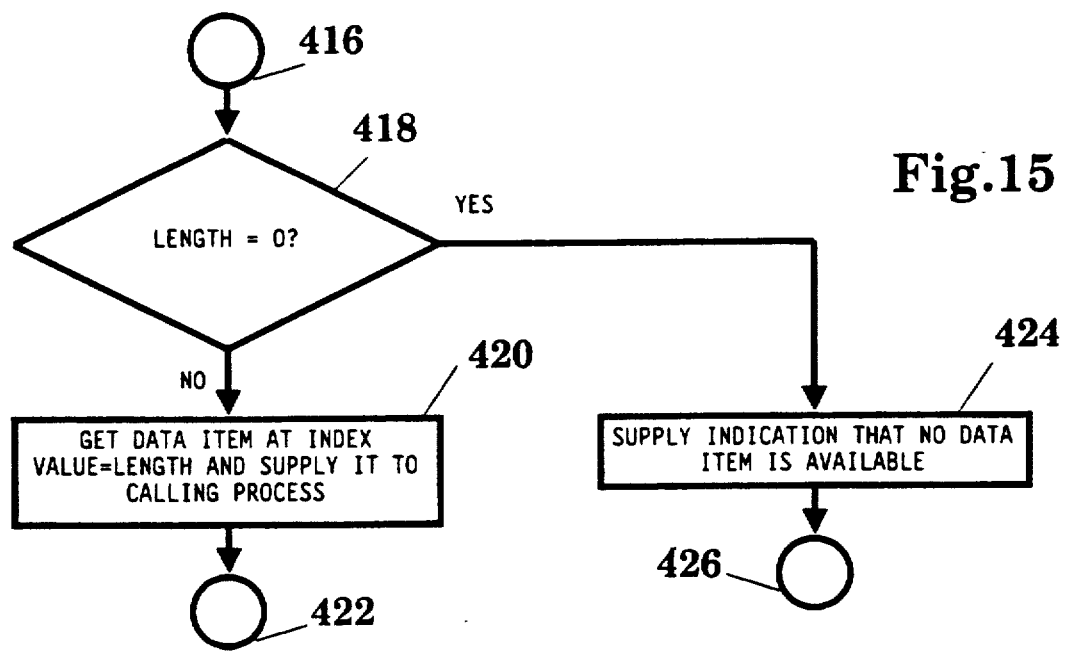

FIG. 15 shows a procedure for reading the latest value received on a stream. The procedure is entered at 416 and starts by checking whether the stream is of zero length at step 418. If not, the procedure obtains the data item for the index value equal to the stream length at step 420 and supplies it to the calling process, before returning control at 422. Otherwise the procedure supplies an indication that no data item is available, at step 424, before returning control at 426.

Other read functions can be provided. One possibility is a procedure to read the next data item following the one most recently obtained via the same output. This would simply require that the output of the storage device retain a record of the index value for which the last data item was supplied. Another possibility is a move command, which specifies an index value to which the output is to be set without any data item being read. This would be useful in preparing to use a read-next-item operation.

A set of data items having adjacent index values in the same stream of data items could be requested, by defining the index value of the first item in the set and the number of items required, with no data item being supplied until all the items in the set are available. Data items from several different streams could be requested, with the actual index value for each stream having some predetermined relationship (which may be different for each stream) to a common reference index value. This would facilitate retrieval of corresponding data items generated at the same time from different sensors, for example.

If the data processor of this invention is implemented with fewer CPUs than processes, and in particular with a single CPU, then a supervisory or scheduling program is required to coordinate allocation of CPU resources between different processes. Such a scheduling program may simply maintain a first list of processes which are able to be run immediately, and a second list of processes which are suspended awaiting data items. Each process is assigned some priority rating by means of which the scheduling program can determine which of the processes in the first list should be executed in preference to the other processes in that list. When a process requires a data item it requests it by calling a read procedure as explained above. If the data item is available it is supplied immediately and the process continues execution. Otherwise the read procedure suspends execution of itself and therefore of the calling process. The suspension of a process has the effect of transferring that process from the first list to the second list. Similarly, the reactivation of a process by a write procedure writing a requested data item transfers the process back to the first list. When an executing process is transferred to the second list, the scheduling program scans the first list to identify the next process to be executed in accordance with the priority ratings. If two or more CPUs are used, each CPU executes a process and upon completing it commences execution of the highest priority process waiting in the first list of processes.

There has been described and illustrated herein methods and systems in accordance with the present invention for processing data. While particular embodiments of the invention have been described, it is not intended that the invention be limited thereby. Thus the invention has been described in relation to processing of data items which occur in a sequential or serial manner. Obviously data items received in parallel can be readily rendered sequential by appropriate buffering. Also the sequence need not necessarily be a time dependent sequence. Although all processes have been shown as receiving data items from at least one stream, it is also possible to envisage processes which do not receive any data items but only generate data items, for example to supply time and date information or a representation of a waveform. Therefore it will be apparent to those skilled in the art that various changes and modifications may be made to the invention as described without departing from the spirit and scope of the appended claims.

We claim:

1. A computer method of processing the logging data acquired from a sonde transiting an oil well borehole comprising the steps of:

acquiring data from a transducer in the sonde indicative of a geological property of the formation surrounding the borehole;

writing the geological data to a geological data memory store as a stream of sequential data items, said geological data memory store being operable for receiving and storing only the geological data stream;

performing a first process including the substeps
   (a) sequentially reading a geological data item of interest from the geological data store,
   (b) determining a first reference value using said geological data item of interest,
   (c) writing the first reference value to a first reference value memory store in a stream of sequential data items, said first reference value memory store being operable for receiving and storing only the first reference value stream, and
   (d) repeating substeps (a)–(c) with another geological data item read in sequential order;

performing a second process including the substeps
   (a) sequentially reading a geological data item of interest from the geological data store,
   (b) determining a second reference value using said geological data item of interest,
   (c) writing the second reference value to a second reference memory store in a stream of sequential data items, said second reference memory store being operable for receiving and storing only the second reference value stream, and
   (d) repeating substeps (a)–(c) with another geological data item read in sequential order;

the first and second processes being concurrent processes with the rate of performing one process not altering the determination of the reference value in the other process.

2. The method of processing logging data of claim 1, wherein the second process determines a sonde command as the second reference value, writes the sonde command to the second reference memory store which receives and stores only sonde commands, and includes the substep of transmitting the command to affect sonde operation.

3. The method of processing logging data of claim 1, wherein the first process is performed by a first microprocessor and the second process is performed by a second microprocessor.

4. The method of processing logging data of claim 1, wherein the first and second processes are performed by a single microprocessor.

5. The method of processing logging data of claim 1, wherein one process reads sequentially every geological data item written to the geological data store.

6. The method of processing logging data of claim 1, wherein one process reads sequentially only the latest geological data item written to the geological data store.

7. The method of processing logging data of claim 1, wherein said writing geological data step a data item is written every t time period and one process includes the step of terminating the data acquisition if a geological data item is not written to said geological data store at least every t time period.

8. The method of processing logging data of claim 7, wherein the terminating step includes the substeps of: writing a terminate control reference value to a store memory which is operable for receiving and storing only the terminate control reference values, and transmitting the terminate control reference value as a command to the sonde.

9. The method of processing logging data of claim 1, wherein said reading steps do not alter the data items contained in said memory stores.

10. The method of processing logging data of claim 1, including the steps of:

acquiring data from a second transducer indicative of the speed of the sonde transiting the borehole;

writing the speed data to a speed memory store as a stream of sequential data items, said speed memory store being operable for receiving and storing only the speed data stream.

11. The method of processing logging data of claim 10, wherein the second process includes the substeps of:

sequentially reading a speed data item of interest from the speed memory store, determining said second reference value using said geological store data item and said speed store data item, writing the second reference value to a change speed memory store if the speed store data item does not fall within an acceptable speed range.

12. The method of processing logging data of claim 1, wherein said stores each comprise a set of known memory locations, the writing steps including the substeps of sequentially identifying the memory locations in the store using unique index values.

13. A computer-implemented method of processing the logging data acquired from a sonde transisting an oil well borehole comprising the steps of:

acquiring data from a transducer in the sonde indicative of a geological property of the formation surrounding the borehole;

writing the geological data to a geological data memory store as a stream of sequential data items, said geological data memory store being operable for receiving and storing only the geological data stream;

performing a first process in a time period including the substeps
    (a) sequentially locating the memory location for a geological data item of interest in the geological data store,
    (b) reading any geological data item written to said memory location within said time period,
    (c) repeating substeps (a)–(b) for another memory location for another geological data item in sequential order;

performing a second process including the substeps
    (a) sequentially reading a geological data item of interest from the geological data store, (b) determining a reference value using said geological data item of interest, (c) writing the reference value to a reference memory store in a stream of sequential data items, said reference memory store being operable for receiving and storing only the reference value stream, and (d) repeating substeps (a)-(c) with another geological data item in sequential order;

the first and second processes being concurrent processes with the rate of performing one process not altering the determination of the reference value in the second process.

14. The method of processing logging data of claim 13, the first process including the substep of writing a command data item to a command store if a geological data item is read.

15. The method of processing logging data of claim 13, the first process including the substep of writing a command data item to a command store if a geological data item is not read.

16. A computer-implemented method of processing data acquired from a sensor comprising the steps of:

acquiring data from a sensor;

writing the sensor data to a sensor data memory store as a stream of sequential data items, said sensor data memory store being operable for receiving and storing only the sensor data stream;

performing a first process including the substeps (a) sequentially reading a sensor data item of interest from the sensor data store, (b) determining a first reference value using said a sensor data item of interest, (c) writing the first reference value to a first reference value memory store in a stream of sequential data items, said first reference value memory store being operable for receiving and storing only the first reference value stream, and (d) repeating substeps (a)-(c) with another sensor data item in sequential order;

performing a second process including the substeps (a) sequentially reading a sensor data item of interest from the sensor data store, (b) determining a second reference value using said sensor data item of interest, (c) writing the second reference value to a second reference memory store in a stream of sequential data items, said second reference memory store being operable for receiving and storing only the second reference value stream, and (d) repeating substeps (a)-(c) with another sensor data item in sequential order;

the first and second processes being concurrent processes with the rate of performing one process not altering the determination of the reference value in the other process.

17. The method according to claim 16, wherein said first and second processes are performed on a single microprocessor.

18. The method according to claim 16, wherein said first process is performed on a first microprocessor and said second process is performed on a second microprocessor.

19. The method according to claim 16, wherein said first stream comprises sensor readings from a sensor traveling along a trajectory.

20. The method according to claim 19, wherein said sensor is a logging sonde transiting a borehole.

21. The method according to claim 16, the first process being operable to terminate operation if a sensor reading is not obtained within a preset time period.

22. The method according to claim 16, wherein each store is a discrete storage device dedicated for receiving data items only from its respective stream.

23. The method according to claim 16, wherein one process reads sequentially every sensor data item written to the sensor data store.

24. The method of processing logging data of claim 16, wherein one process reads sequentially only the latest sensor data item written to the sensor data store.

25. A computer-implemented method of processing data acquired from a sensor comprising the steps of:

acquiring data from a sensor;

writing the sensor data to a sensor data memory store as a stream of sequential data items, said sensor data memory store being operable for receiving and storing only the sensor data stream;

performing a first process in a time period including the substeps (a) sequentially locating the memory location for a sensor data item of interest in the sensor data store, (b) reading any sensor data item written to said memory location within said time period, (c) repeating substeps (a)-(b) with another memory location for a sensor data item in sequential order;

performing a second process including the substeps (a) sequentially reading a sensor data item of interest from the sensor data store, (b) determining a reference value using said sensor data item of interest, (c) writing the reference value to a reference memory store in a stream of sequential data items, said reference memory store being operable for receiving and storing only the reference value stream, and (d) repeating substeps (a)-(c) with another sensor data item in sequential order;

the first and second processes being concurrent processes with the rate of performing one process not altering the determination of the reference value in the second process.

26. The method of processing logging data of claim 25, the first process including the substep of writing a command data item to a command store if a sensor data item is read.

27. The method of processing logging data of claim 25, the first process including the substep of writing a command data item to a command store if a sensor data item is not read.

* * * * *